⑥

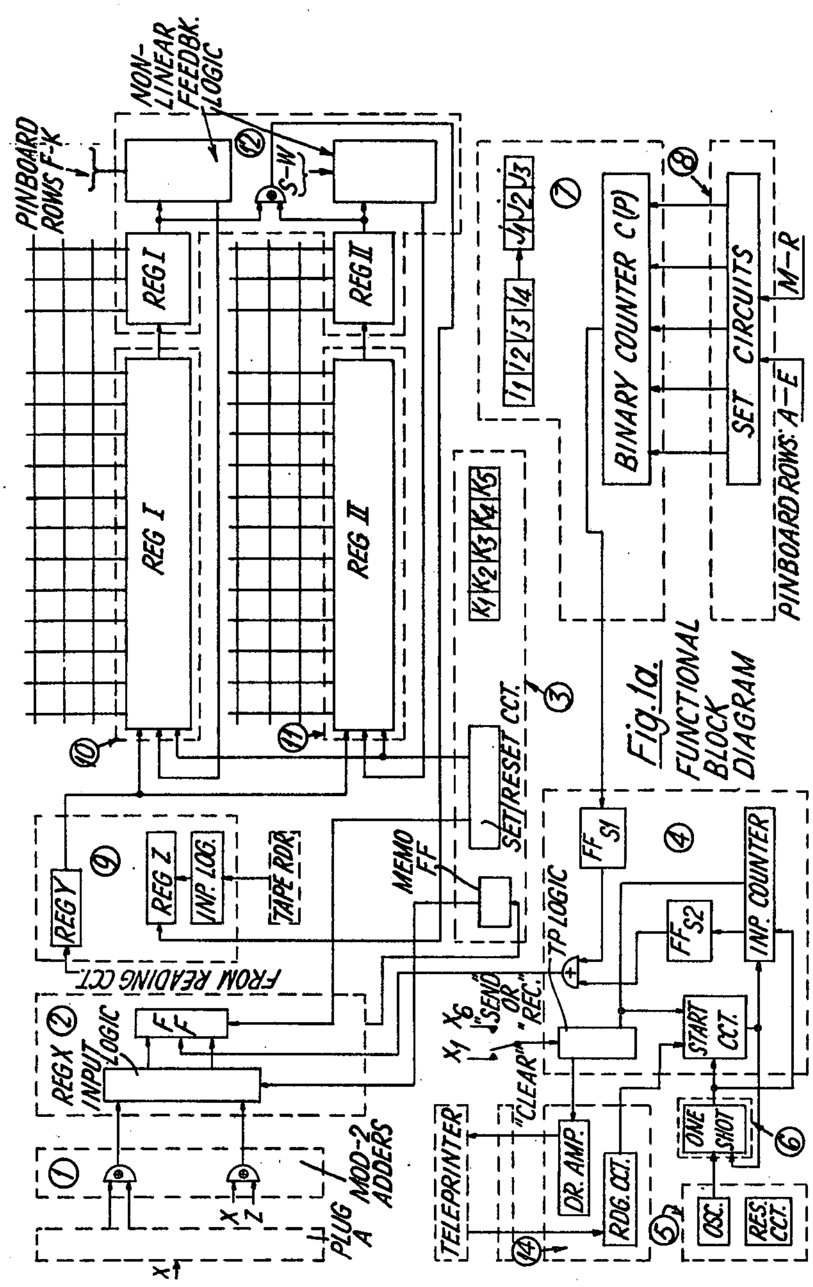
Fig. 1a. FUNCTIONAL BLOCK DIAGRAM
Inventors
KAARE R. MEISINGSET
IVAR MO
PER R. ABRAHAMSEN
By
Menotti J. Lombardi Jr.
Attorney Inventors
KAARE R. MEISINGSET
IVAR MO
PER R. ABRAHAMSEN
By
Attorney Inventors
KAARE R. MEISINGSET
IVAR MO
PER R. ABRAHAMSEN
By
Menotti J. Lombardi, Jr.
Attorney Inventors
KAARE R. MEISINGSET
IVAR MO
PER R. ABRAHAMSEN
By
Menotti J. Lombardi, Jr.
Attorney Inventors
KAARE R. MEISINGSET
IVAR MO
PER R. ABRAHAMSEN
By
Menotti J. Lombardi Jr.
Attorney Inventors
KAARE R. MEISINGSET
IVAR MO
PER R. ABRAHAMSEN
By Menotti J. Lombardi Jr.
Attorney Inventors
KAARE R. MEISINGSET
IVAR MO
PER R. ABRAHAMSEN
By
Menotti J. Lombardi Jr.
Attorney Inventors
KAARE R. MEISINGSET
IVAR MO
PER R. ABRAHAMSEN
By
Attorney Inventors
KAARE R. MEISINGSET
IVAR MO
PER R. ABRAHAMSEN
By
Menotti J. Lombardi, Jr.
Attorney Inventors
KAARE R. MEISINGSET
IVAR MO
PER R. ABRAHAMSEN
By
Menotti J. Lombardi Jr.
Attorney Inventors
KAARE R. MEISINGSET
IVAR MO
PER R. ABRAHAMSEN
By
Menotti J. Lombardi, Jr.
Attorney Inventors
KAARE R. MEISINGSET
IVAR MO
PER R. ABRAHAMSEN
By
Menotti J. Lombardi, Jr.,
Attorney Inventors
KAARE R. MEISINGSEN
IVAR MO
PER R. ABRAHAMSEN
By
[signature]
Attorney Inventors
KAARE R. MEISINGSET
IVAR MO
PER R. ABRAHAMSEN
By Meneth J. Lombardi Jr.
Attorney Inventors
KAARE R. MEISINGSET
IVAR MO
PER R. ABRAHAMSEN
By
Menotti J. Lombardi Jr.
Attorney Inventors
KAARE R. MEISINGSET
IVAR MO
PER R. ABRAHAMSEN
By Merritt J. Lombard Jr.
Attorney Inventors
KAARE R. MEISINGSET
IVAR MO
PER R. ABRAHAMSEN
By Menotti J. Lombardi, Jr.
Attorney

Inventors
KAARE R. MEISINGSET
IVAR MO
PER R. ABRAHAMSEN
By Menotti J. Lombardi Jr.
Attorney Inventors
KAARE R. MEISINGSET
IVAR MO
PER R. ABRAHAMSEN
By Menotti J. Lombardi Jr.
Attorney (14)

Inventors
KAARE R. MEISINGSET
IVAR MO
PER R. ABRAHAMSEN
By Menotti J. Lombardi, Jr.
Attorney

ENCIPHERING TELEPRINTER TEXT FOR TELEX CHANNELS

Inventors
KAARE R. MEISINGSET
IVAR MO
PER R. ABRAHAMSEN
By Menotti J. Lombardi, Jr.
Attorney Inventors
KAARE R. MEISINGSET
IVAR MO
PER R. ABRAHAMSEN
By Kenneth S. Lombardi Jr.
Attorney 3,496,291

ENCIPHERING TELEPRINTER TEXT FOR TELEX CHANNELS

Kaare Ragnar Meisingset, Stabekk, Ivar Mo, Lorenskog, and Per R. Abrahamsen, Kjeller, Norway, assignors to International Standard Electric Corporation, New York, N.Y., a corporation of Delaware Filed June 12, 1967, Ser. No. 645,316
Claims priority, application Norway, June 17, 1966, 163,525/66
Int. Cl. H04l 9/02
U.S. Cl. 178—22 3 Claims

ABSTRACT OF THE DISCLOSURE

There is provided a method for omitting the characters ALL SPACE and WHO ARE YOU? (letter D in upper case) from an enciphered teleprinter text which is to be transmitted via telex channels to unattended stations. A clear text not including the character ALL SPACE is processed with a key material at the transmitting and receiving end.

CROSS-REFERENCES TO RELATED APPLICATIONS

This application is related to copending applications of P. R. Abrahamsen-K. R. Meisingset for Ciper Unit, Ser. No. 645,315, filed June 12, 1967, and I. Mo-P. R. Abrahamsen-K. R. Meisingset for Key Material Generator, Ser. No. 645,305, filed June 12, 1967.

BACKGROUND OF THE INVENTION

The present invention relates to a method for preparing an enciphered teleprinter text which is suitable for being transmitted via telex channels, and particularly to a method for omitting the characters ALL SPACE and WHO ARE YOU? (letter D in upper case) from an enciphered teleprinter text which is to be transmitted via telex channels to unattended stations, where a clear text not including the character ALL SPACE is processed with a key material including all possible teleprinter combinations at the transmitting end and where the clear text is reproduced at the receiving end by processing with corresponding key material.

It has previously been suggested to substitute some of the unwanted characters in a teleprinter text by combinations of allowable characters at the transmitting end so that the transmitted text does not contain any unwanted characters. The unwanted characters are then recovered at the receiving end by detecting the transmitted combinations of allowable characters.

This method has, however, the drawback that it cannot be used in connection with the usual automatic transmitter on the teleprinter printing and punching the cipher text, as the unwanted characters are not coded according to a one-to-one rule.

SUMMARY OF THE INVENTION

The object of the present invention is to provide a method by means of which a clear text from a conventional automatic transmitter may be enciphered into a text which may be punched by the same teleprinter and from which the characters ALL SPACE and WHO ARE YOU? are omitted. Such teleprinter text may be received by any commercial teleprinter.

The main feature of the invention is that before enciphering the clear text at the transmitting end, the character FIGURE SHIRT is converted into the character LINE FEED (or CARRIAGE RETURN), while both characters LINE FEED and CARRIAGE RETURN are converted into the character CARRIAGE RETURN (or LINE FEED), whereupon the converted clear text is processed with the enciphering key material so as to produce an enciphered text not including the characters ALL SPACE and FIGURE SHIFT, and that after a similar deciphering of the enciphered text at the receiving end, the character LINE FEED (or CARRIAGE RETURN) is converted into the character FIGURE SHIFT, while single CARRIAGE RETURN (or LINE FEED) characters remain unconverted, but a series of CARRIAGE RETURN (or LINE FEED) characters are alternately converted into the characters CARRIAGE RETURN and LINE FEED (or LINE FEED and CARRIAGE RETURN).

A further feature of the invention is that the clear text to be enciphered at the transmitting end is converted into the converted clear text in a register having 30 possible positions, corresponding to all teleprinter combinations but ALL SPACE and FIGURE SHIFT, and that the converted clear text is processed with the key material in this register so that the output from this register corresponds to an enciphered text not including the characters ALL SPACE and FIGURE SHIFT.

A further feature is that enciphered text to be deciphered at the receiving end is diciphered to reproduce the converted clear text in a register having 30 possible positions corresponding to all teleprinter combinations but ALL SPACE and FIGURE SHIFT by processing with the key material and that the converted clear text is converted in this register so as to reproduce a clear text which is slightly modified relative to the clear text at the transmitting end.

BRIEF DESCRIPTION OF THE DRAWINGS

Above mentioned and other features and objects of the invention will clearly appear from the following detailed description of an embodiment of the invention taken in conjunction with the drawings, where:

FIG. 1*a* shows functional block diagram of an embodiment of the invention,

DECRIPTION OF PREFERRED EMBODIMENT

Functional block diagram

Figure 1B:
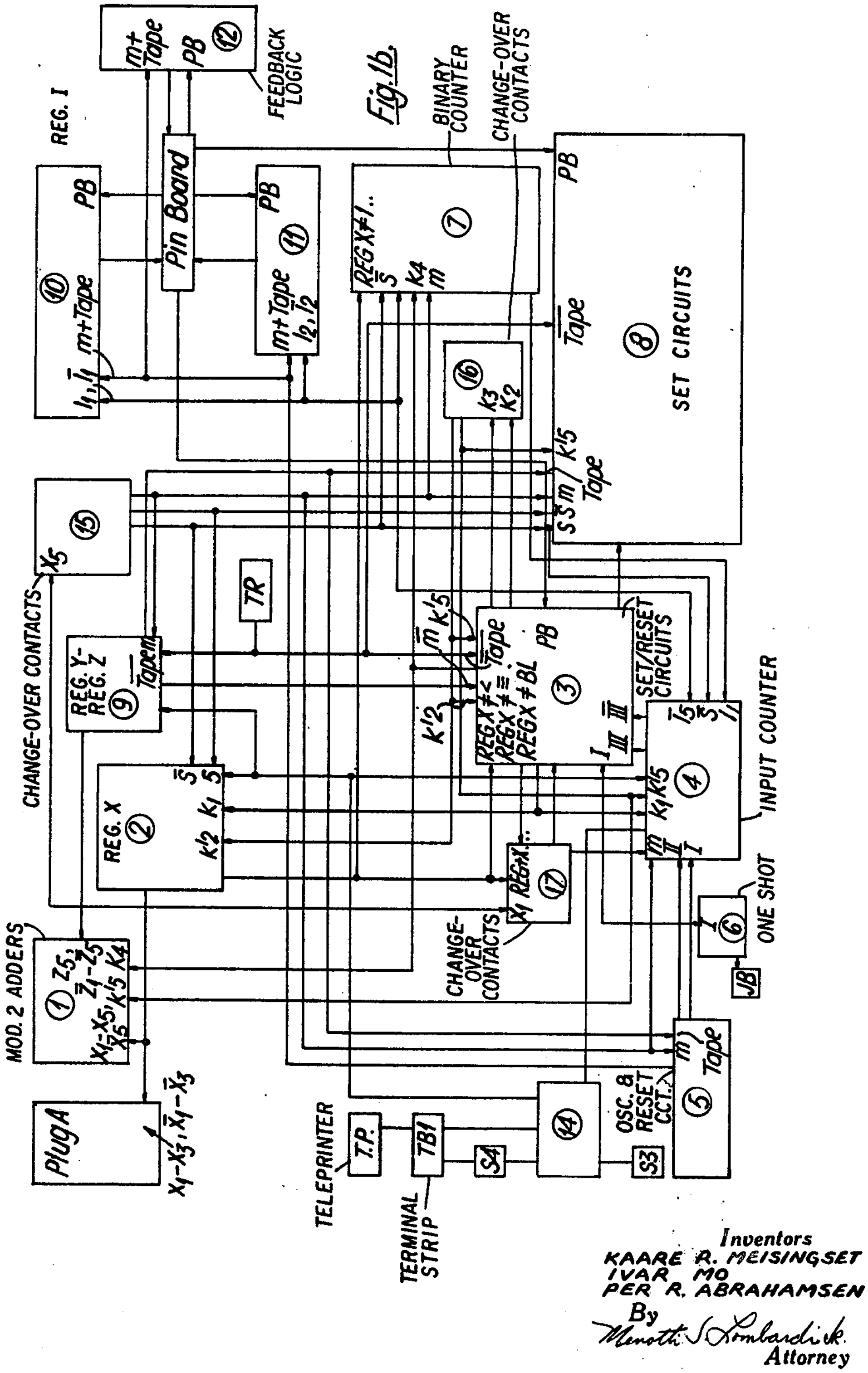
FIG. 1*b* shows a block diagram showing the main interconnections between the blocks.

In FIG 1*a* is shown a functional block diagram which has close connection with the detailed block schematic. The following main parts of the block diagram will be explained in some detail below:

Generator of pseudo-random key bits; Generator of 5-bit number "P"; Counter "C(P)"; Input register "Reg X"; Pinboard; Plug A. Thereafter the start procedure and the enciphering and deciphering procedures and telex operations are also explained in connection with the functional block diagram.

Generator of pseudo-random key bits.—The key generator comprises two non-linear feed back shift registers called REG I and REG II respectively. Both registers have 15 stages, REG I has twelve of these situated in block 10 and three in block 12, and REG II has twelve stages in block 11, and three stages in block 12. The non-linear feed back logics for both registers are situated in block 12. It will be seen from the block diagram that the two outputs from the registers are added together modulo-2 and that the resulting sequence is stored in REG Z in block 9. During enciphering or deciphering the two registers will be shifted, in order always to present a fresh key character in REG Z. All the outputs from the two registers are fed to separate columns on a pinboard. Which outputs to use for the non-linear feed back functions are chosen by means of pins on the pinboard. For register I rows F, G, H and K determine the nonlinear feed back function, and for register II rows S, T, V, W.

Generator of 5-bit number "P".—"P" is a 5-bit pseudo-random number produced by the two main registers by means of 5 outputs from each register, selected by means of pins on the pinboard. It will be seen that pinboard rows A, B, C, D, E, M, N, P, Q and R are fed to block 8, and into the set-circuits for the binary counter "C(P)." Each one of the five set input signals is a modulo-2 addition of one output signal from REG I and one output signal from REG II. Thus it will be understood that these combined signals also are pseudo-random.

Counter "C(P)".—The binary counter in block 7 will always count downwards. The function of this counter is to control the number of shift pulses fed to the input register REG X. During enciphering, the number "P" is initially set into the binary counter, which means that REG X is supplied with "P" shift pulses, but during deciphering the number 31–"P" is initially set into the counter. Also, during deciphering, the counter will stop when containing 1, instead of 0, which means that now it will count 31–"P"–1 counts, that is 30–"P" counts. The meaning of this will become clear when the ciphering procedures are described.

Input register REG X.—REG X in block 2 consists of 5 equal stages, of which a typical one is shown in FIG. 1*a*. In addition it has a 6th stage which is a sort of buffer stage. REG X has two modes of operation.

(a) It works as a normal 5-bit shift register receiving shift pulses from the input counter in block 4. The input to the first stage comes from the teleprinter through the reading circuit in block 14. (This connection is not shown in the functional block diagram.)

(b) It works as a feed back shift register with each stage comprising a modulo-2 adder and a flip-flop, where any output can be connected to any input by means of solder connections on the code plug shown to the left, and both these connections are made such as to result in a maximal length sequence $2^5-1=31$. This behavior is symbolized in FIG. 1*a* by the X coming through plug A to the left through the modulo-2 adder in block 1 and through the input logic in block 2 up to the flip-flop.

It is also possible to set each bit of the 5-bit register REG X to the result of the modulo-2 addition of one bit in REG X itself, and one corresponding bit in REG Z. This is symbolized in FIG. 1*a* by the lower modulo-2 adder in block 1 with inputs X and Z.

Pinboard.—The pinboard is a board with 10 horizontal terminal strips and 30 vertical terminal strips arranged in a matrix with 300 working positions (crosspoints). The vertical terminal strips are connected to the 30 outputs from the two main registers. Arbitrary outputs from these two registers can be connected to the horizontal rails by means of pins on this pinboard inserted in crosspoints. Then these arbitrary outputs will be led to the non-linear feedback functions and to the set circuits for the number "P." Also, it is possible by means of row L on the pinboard to set the two registers initially with a starting content.

Plug A.—When REG X works as a feedback shift register the five feedback signals are fed back to the five inputs through the plug A shown in the upper left corner of the functional block diagram. When the straps on this plug are made properly, REG X will cycle through a maximal length sequence, i.e. a cycle of 31.

Other parts shown in the functional diagram.—It will be apparent from the functional block diagram that it is possible to set REG Z from a tape reader through the input logic in block 9. This mode of operation may be used by those customers who require complete security for their messages. The main registers REG I and REG II do not function during this mode of operation, so the input to the left of REG Z is zero. In this case the key-sequence comes from a random tape inserted into the tape reader.

REG Y, also situated in block 9, is only used during the start phase as a buffer register on the enciphering unit. Block 3 contains three circuits which are not yet spoken about.

(1) The MEMO FF is a flip-flop which remembers whether a CARRIAGE RETURN character is detected or not.

(2) The SET/RESET circuit is used during the start phase to reset the input register and two main registers.

(3) The block called $K_1$–$K_5$ is a normal shift register which is connected as a ring counter, and which is used to control the enciphering and deciphering processes. During enciphering the program counter functions as follows: In $K_1$ the teleprinter character is read into the register REG X. In $K_2$ the contents of this register is tested in order to find out whether it contains a FIGURE SHIFT or a CARRIAGE RETURN. If a FIGURE SHIFT is detected, this character is converted into a CARRIAGE RETURN. However, if a CARRIAGE RETURN is detected, it is converted into a LINE FEED. The reason for this will become clear when the telex operation is described. In $K_3$ the pseudo-random 5-bit number "P" is fed into the binary counter "C(P)." In $K_4$ the input register REG X is connected as a feedback shift register. The counter "C(P)" counts down to zero and the pulses from this are fed through $FF_{S1}$ in block 4, to the input register in block 2. In $K_5$ the contents of REG X and REG Z are added modulo-2 and the result put into REG X again. Thereafter, the contents is tested in order to find out whether the resulting character is an allowed character for telex operation or not. If not, the modulo-2 addition is performed once more. The resulting character then is always an allowed character.

Block 7 contains two ring counters, called $i_1$–$i_4$ and $j_1$–$j_3$ respectively. The function of these two registers is to control the start phase. The two main registers should always start from a random starting point for each new message to be sent. This means that 6 characters have to be presented to them. The first three are directed to REG I and the next three to REG II by means of the two ring counters mentioned.

In block 5 there is an oscillator of about 25 kHz., which triggers a one shot multivibrator in block 6, which in turn triggers the input counter in block 5. The one shot can be set to different time delays by means of a selector and the different possible teleprinters speeds can thus be realized.

The RESET CCT in block 5 is used in the clear mode or the tape reader mode to reset the two main registers in the key generator.

The TP logic shown in block 4 is a logic which determines the signal delivered to the teleprinter receive coil. This signal consists of a start and a stop pulse supplied by the input counter, and five information bits delivered from the REG X. In the "CLEAR" mode this information comes from register stage number 1, and in "SEND" or "RECEIVE" mode from the buffer stage of REG X. These two inputs are symbolized by the letters $X_1$ and $X_6$ on the functional block diagram.

Enciphering process.—The enciphering process starts when the reading circuits receives the stop pulse of some clear text character X on operation of the keyboard or automatic transmitter of the teleprinter. The reading circuit starts the input counter, which in turn gives shift pulses to REG X, REG I and REG II and REG Z through the flip-flop $FF_{S2}$. In this first phase of the enciphering process REG X is connected as a normal shift register with information input to the first stage, which means that the clear text character will enter REG X, while the preceding enciphered character is sent to the teleprinter from stage number $X_6$ through the teleprinter drive amplifier. When now REG X contains the five information bits, REG Z contains five new key bits, and "C(P)" is set to fresh "P" number. Thereafter, REG X is connected as a maximal period feedback shift register of period 31, and pulses from the 25 kHz. source are fed to "C(P)" and REG X. The supply of these 25 kHz. shift pulses is cut out when "$C(P)$"=0, i.e. after "P" pulses. REG X has then been stepped through "P" states and the present state is therefore a function of "P," which can be symbolized by the expression X(P). At last REG X is set to the result of the addition $X(P)\oplus Z$, where Z is the stored output from the key generator. If the addition gives as result either of the two characters that are not allowed, the addition is performed once more, thus retrieving X(P) because $X(P)\oplus Z\oplus Z=X(P)$. In this case X(P) is used as the enciphering character.

Deciphering process.—The deciphering process starts when the reading circuit receives the start pulse of the enciphered character $X(P)\oplus Z$, which is then shifted into REG X, while the preceding deciphered character is read by the teleprinter through the teleprinter drive amplifier. Then, the contents in REG X and REG Z are added modulo=2 and the result—$X(P)\oplus Z\oplus Z=X(P)$—is put back into REG X. Now, the clear text character X can theoretically be retrieved by shifting REG X "P" steps backwards in the cycle, or by shifting REG X 30–"P" steps in the forward direction. The last method is carried out by setting C(P) to 31–"P" and counting down to 1. On the receiving station the addition REG X⊕ REG Z is of course also performed twice if an unallowed character is detected.

Start procedure.—As explained earlier, 6 characters are needed for providing the main feedback shift registers with start information. These 6 characters are inserted in front of each message to be enciphered and are selected either at random or according to some list giving long cycles in the key generator. These characters are enciphered before transmission by using an initial setting of the main registers from the pinboard as mentioned earlier.

Telex operation.—The cipher text should not contain characters which cannot be punched by a normal teleprinter in a TELEX installation, or chaarcters that will disturb the transmission on a TELEX channel, such as letter D in upper case. Such characters are avoided by not using the character ALL SPACE and FIGURE SHIFT as cipher text. The cipher text alphabet then consists of 30 characters, while there are 31 allowed clear text characters. Therefore, a unique transformation of these 31 characters is not possible. This problem is solved by putting a restriction on the use of CARRIAGE RETURN and LINE FEED. It is observed that on a teleprinter, the operation LINE FEED is nearly always preceded by a CARRIAGE RETURN. It is, therefore, necessary to let a LINE FEED be preceded by CARRIAGE RETURN. The clear text alphabet then, has in fact only 30 characters, thus making unique transformation possible.

Unallowed characters are avoided very easily simply by avoiding the two critical characters in the input register REG X when this is working as a normal linear feedback shift register. Thus, REG X is being stepped along a 30-cycle which contains all possible 5 bit combinations except the two corresponding to the teleprinter characters ALL SPACE and FIGURE SHIFT.

Block diagram

In FIG. 1*b* is shown a block diagram including the main control wires, for giving a better understanding of the detailed schematic.

General Description

In FIG. 1*c–i* and 2*a–h* are shown a detailed block schematic of an embodiment of the invention. The circuit shown represents an off-line tapeless cryptographic equipment capable of enciphering and deciphering normal teleprinter messages in a form compatible with standard telex procedures.

The main blocks are indicated by broken lines and the terminals of each main block are numbered by numbers individual for each main block. The terminals are furthermore provided with designations so that their interconnections should be readily understood.

In nearly all of the main blocks there are indicated suitable test points. These test points are designated TP1, TP2 . . . TP5 and will not be described further.

In the main blocks there are used logical symbols which are described in detail in connection with the symbol diagram, FIG. 6. All of the logic blocks are provided with codes which are individual for each main block. The flip-flops are in addition provided with functional designations in about the middle of the logical symbol.

Figure 1C:
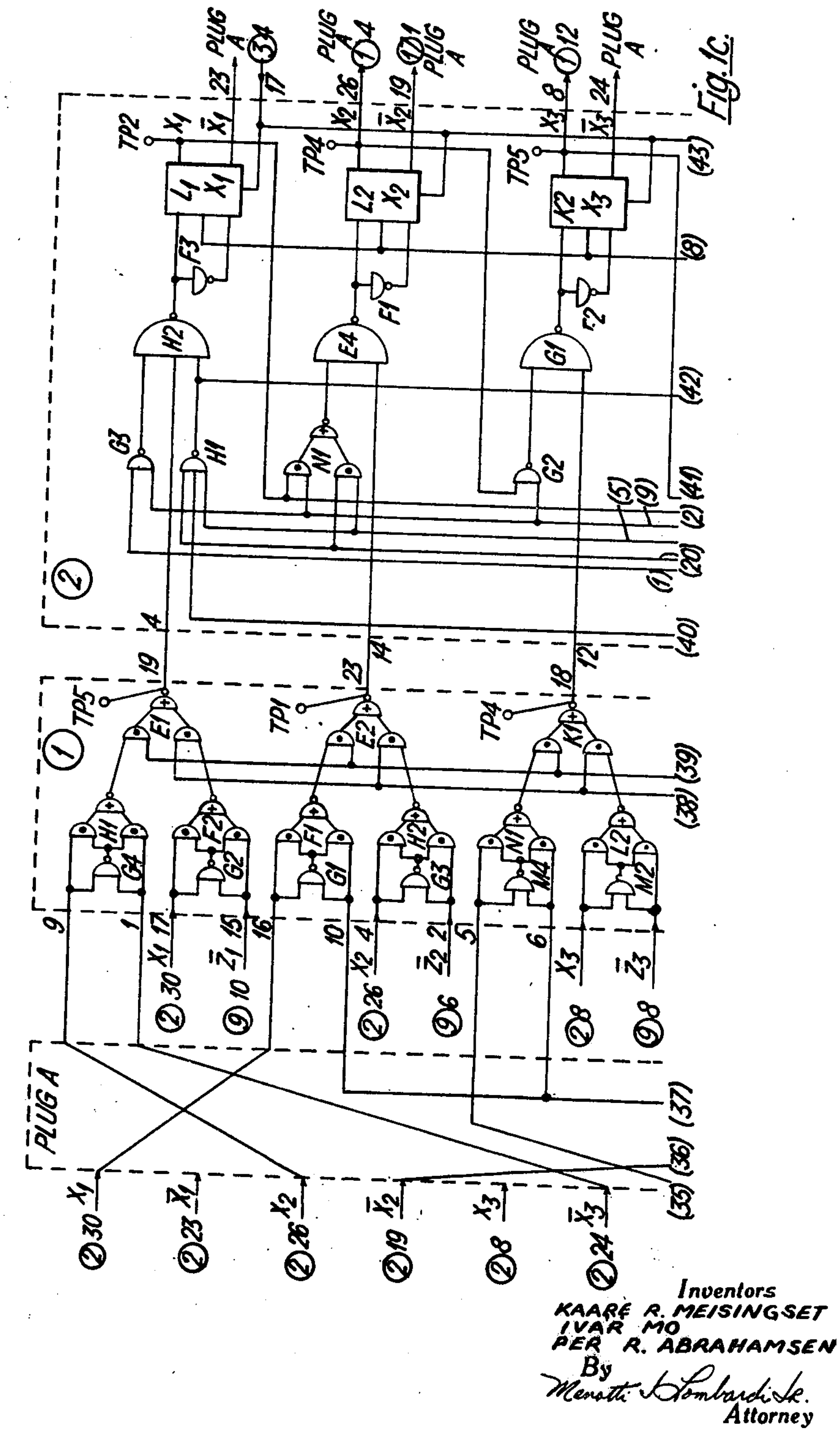
FIGS. 1*c–i* and 2*a–h* show a detailed schematic of most of the blocks shown in FIGS. 1*a* and 1*b*.
Figure 1D:
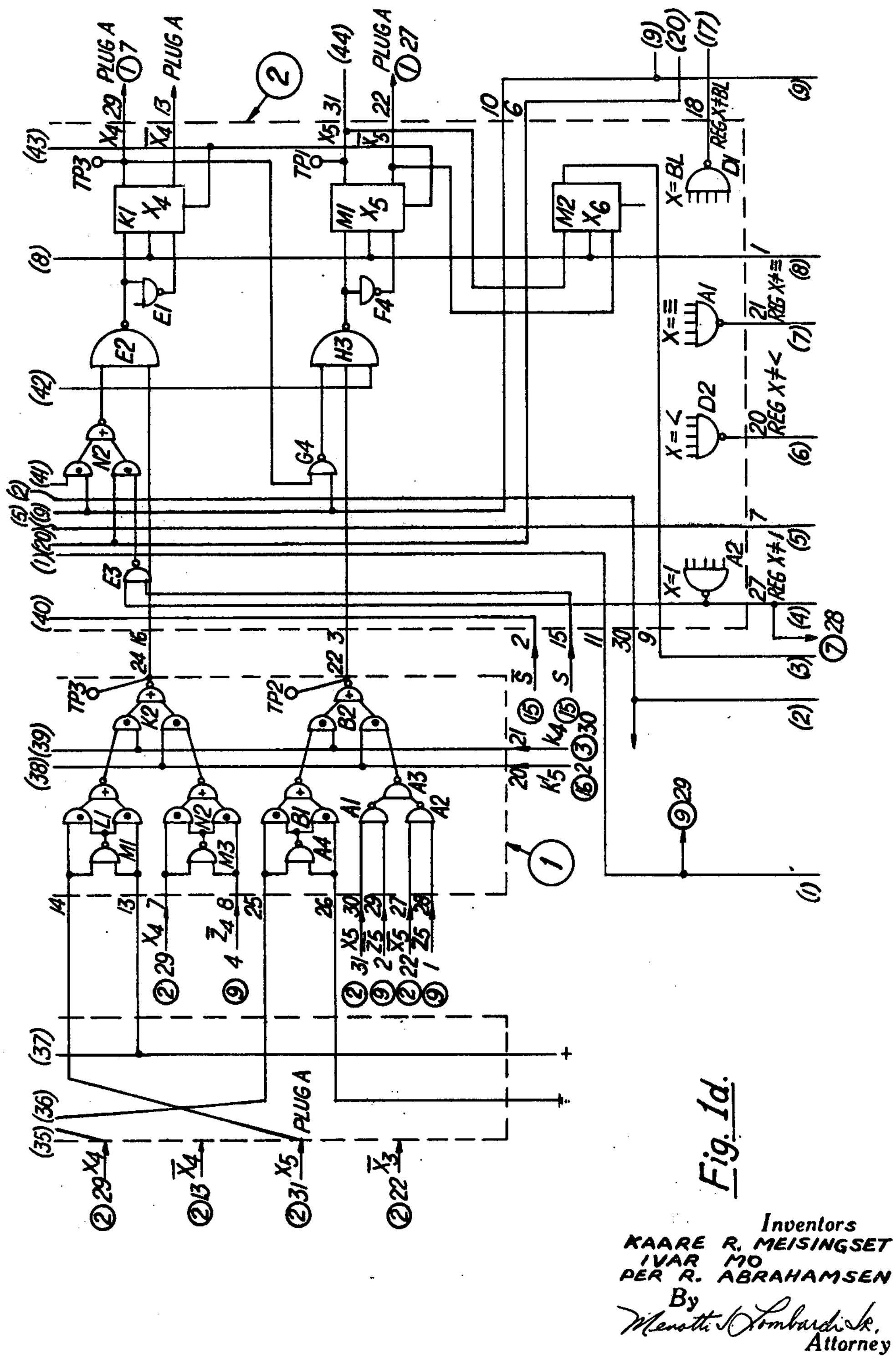

Block 1, FIGS. 1*c*, *d* contains five pairs of modulo-2 adders. All adders by the lowest one comprises one NAND-gate and one EXCLUSIVE-OR-gate. The lowest gate comprises three NAND-gates A1, A2, A3. The outputs of each pair are connected to the inputs of an individual EXCLUSIVE-OR-gate. By means of two gating signals K'5 and K4 either the lower or the upper adder of each pair can have its output switched through to the outputs of the five EXCLUSIVE-OR-gates E1, E2, K1, K2, B2.

Block 2 in FIGS. 1*c*, *d* contains six flip-flops, $X_1$–$X_6$, and associated circuits. The flip-flops $X_1$–$X_5$ constitute a feedback shift register (register X) which is used for storing and handling the information elements of teleprinter character. The flip-flop $X_6$ is used for delay purposes. In addition to the input circuits to the flip-flops $X_1$–$X_6$, block 2 also contains four NAND-gates A2, D2, A1, D1 for detecting when the content of the flip-flops $X_1$–$X_5$, correspond to the teleprinter characters FIGURE SHIFT (1 . . .), CARRIAGE RETURN (<), LINE FEED (≡) and ALL SPACE (BL), respectively.

Figure 2A:
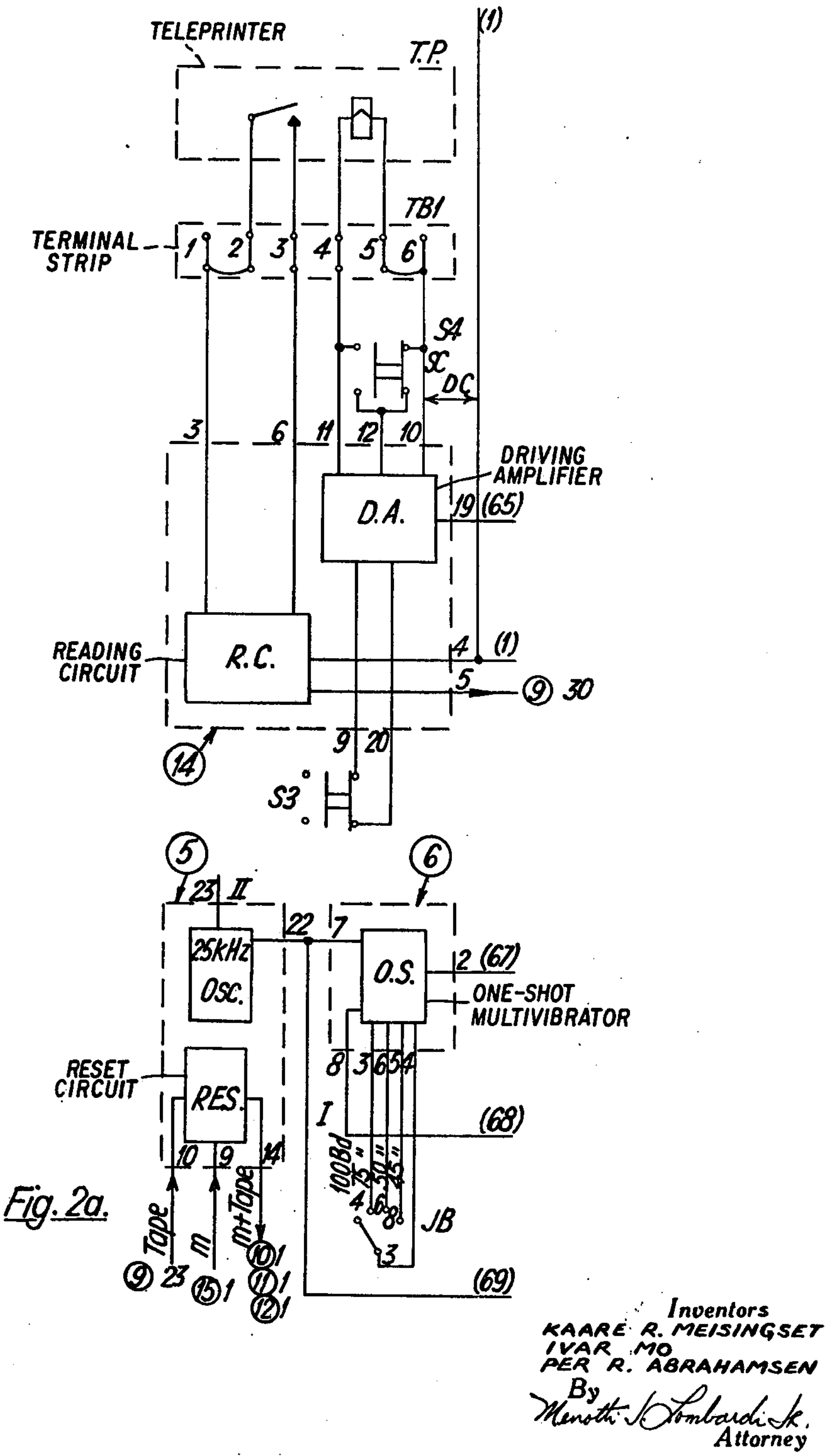
Figure 2B:
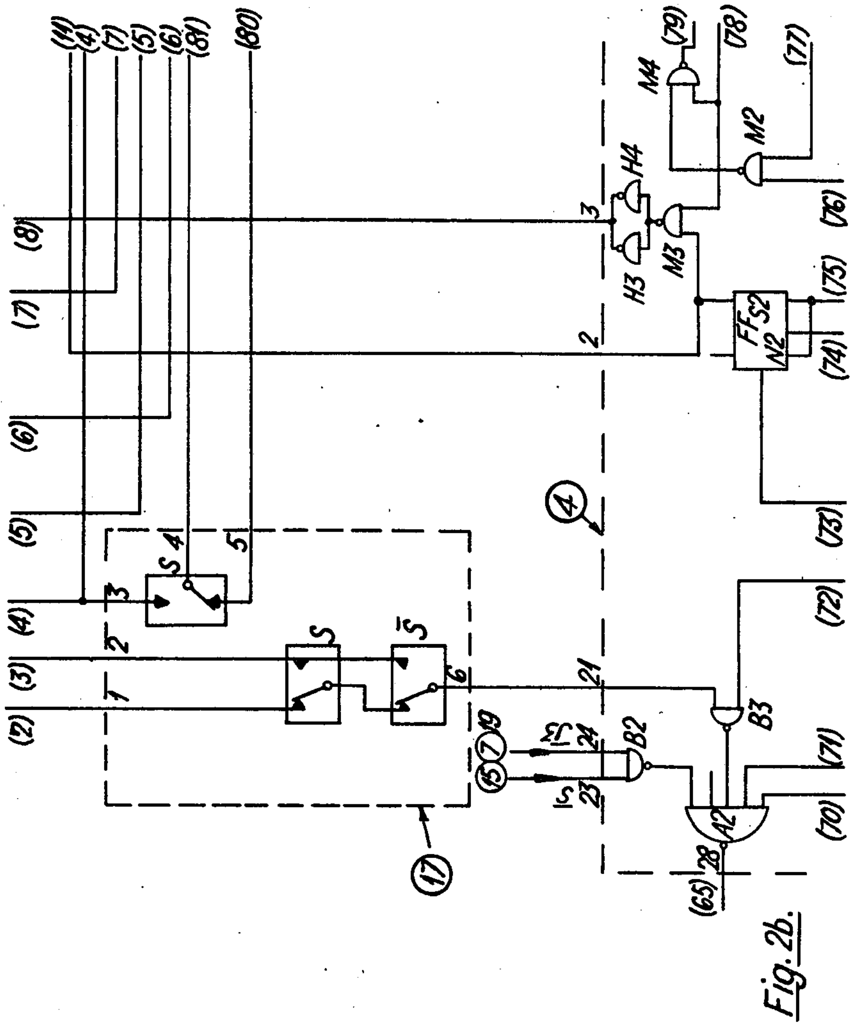
Figure 2C:
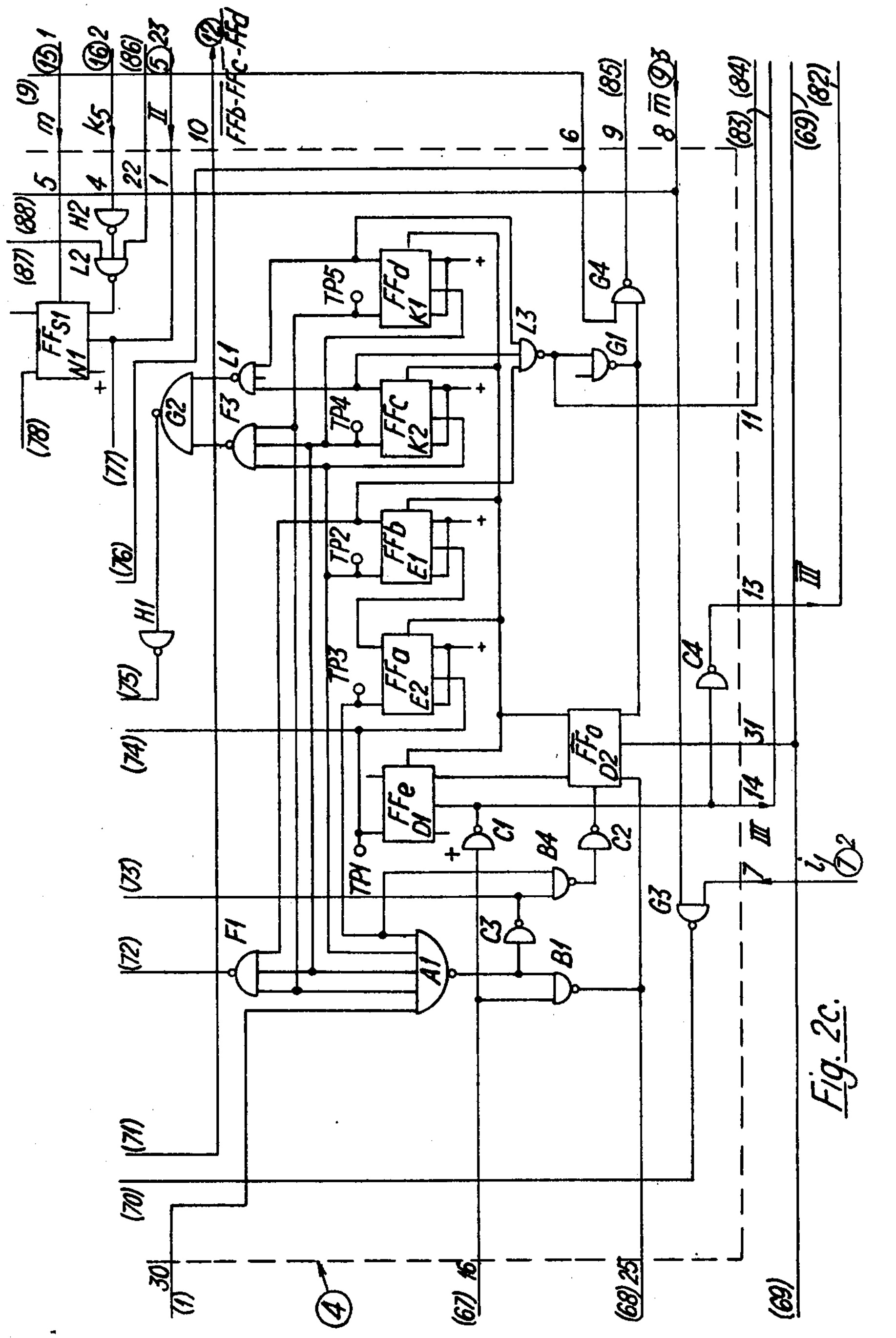
Figure 2D:
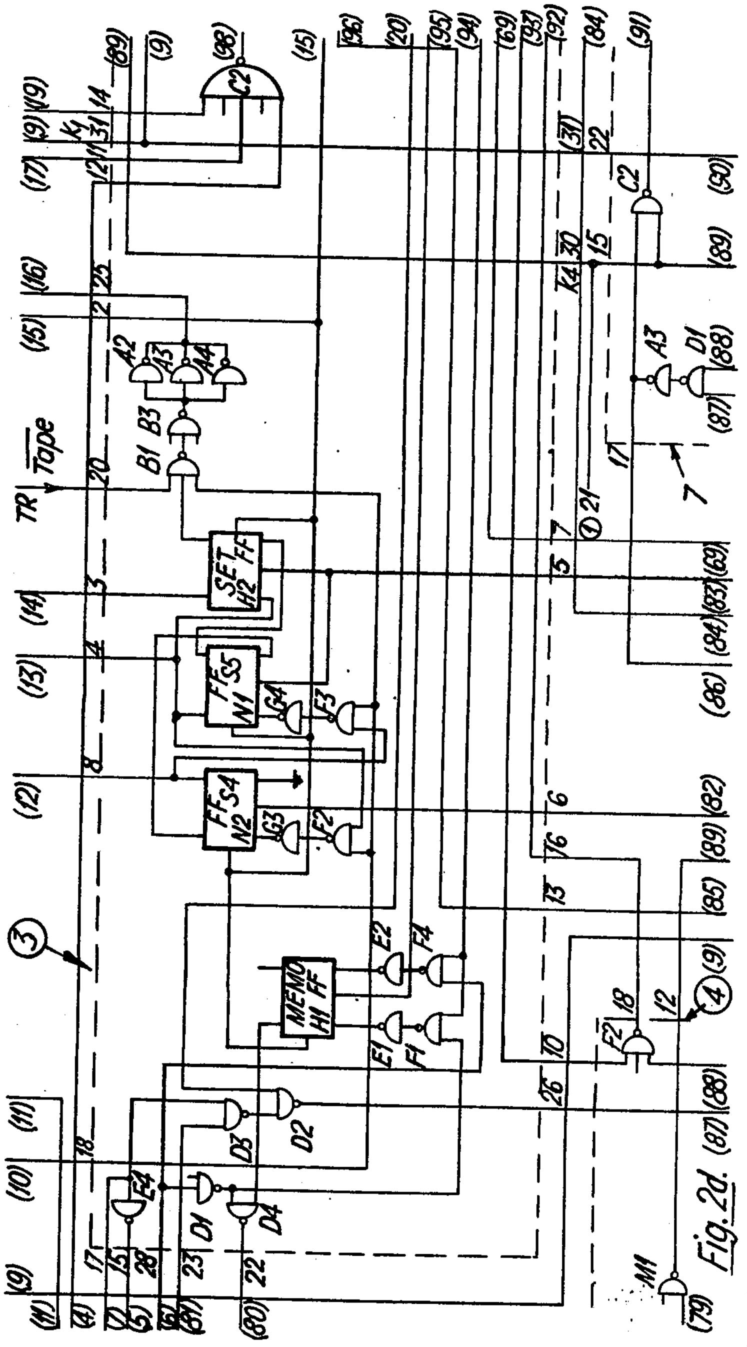

Block 3 in FIGS. 2*d*, *f* contains miscellaneous gating and flip-flop circuits, the most important of which are the MEMO flip-flop used for storing the character LINE FEED during deciphering, the SET flip-flop used for generating the necessary signals for initial setting of the key generator registers, and the main program counter (counter K) comprising five counting stages K1–K5.

Block 4 in FIGS. 2*c*, *b* contains the input counter $\overline{FFo}$, FF*e*, FF*a* FF*b*, FF*d*, $FF_{S2}$, and associated circuits. This is a binary counter used for governing the stepping of teleprinter characters into and out of the equipment.

Block 5, FIG. 2*a* which contains the blocks 25 kHz. OSC (Clock Pulse Generator) and RES (Reset Circuit) is shown in detail in FIG. 4. The reset circuit is used for supplying DC-signals to the main registers in the key material generator.

Figure 3:
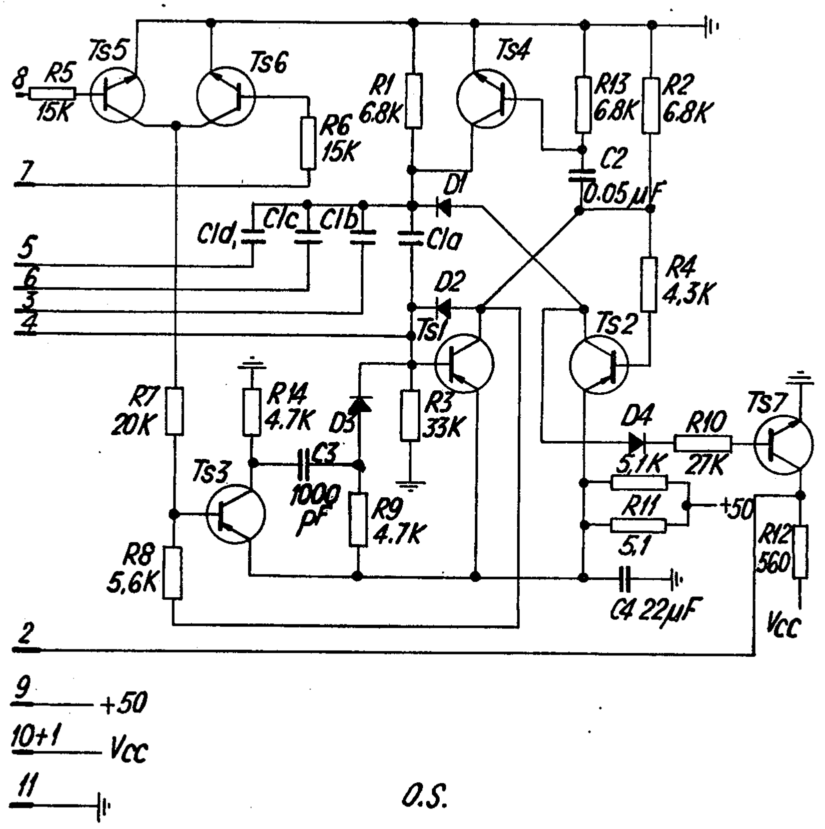
FIG. 3 shows a detailed schematic of the block 6 in FIG. 2*a*, a one-shot pulse generator (OS)

Block 6 in FIG. 2*a* which contains the block OS (One-Shot Circuit or Monostable Circuit with Short Recovery Time) is shown in detail in FIG. 3. This circuit is used for the timing of the input counter.

Block 7 in FIGS. 2*d*, *e*, *f*, *g*, *h* contains a ring counter (counter I) with three stages $i_2$–$i_4$ and another ring counter (counter J) also with three stages $j_1$–$j_3$. These two counters are used for governing the start procedure of the equipment. Block 7 also contains a binary counter (counter P) with five stages $C_1$–$C_5$. The latter is a binary counter used for counting downwards from a setting point received as DC-signals from block 8.

Figure 2E:
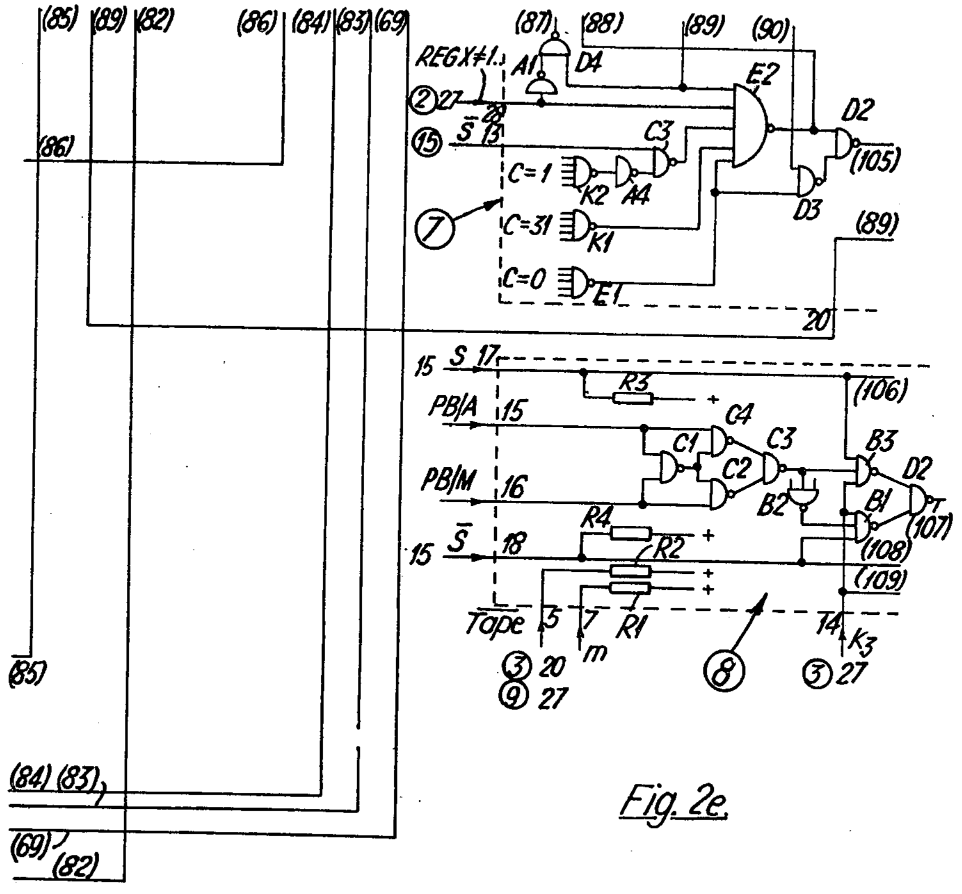

Block 8 in FIGS. 2*e, g, h* contains miscellaneous gating circuits. The gating circuits are used for supplying the counter $C_1$–$C_5$ in block 7 with appropriate information from the key material generator in the enciphering and deciphering mode respectively.

Figure 1E:
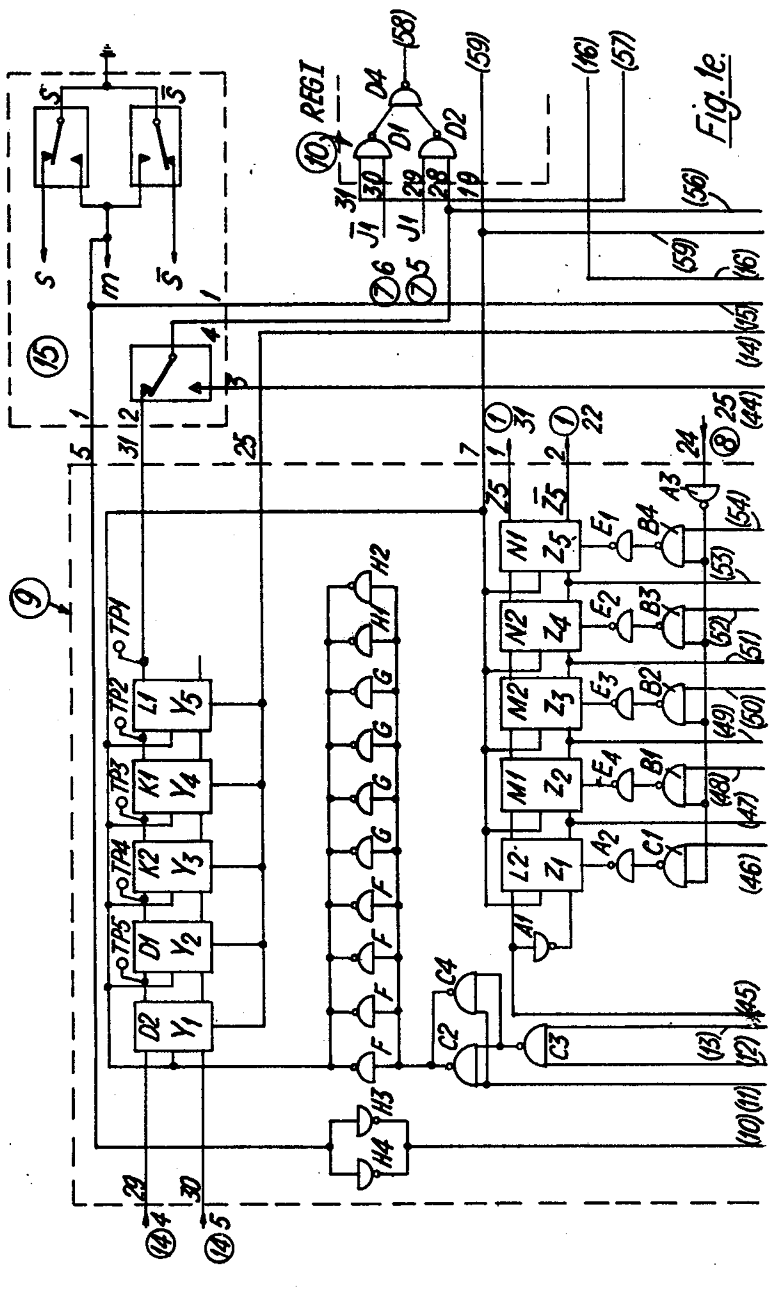

Block 9 in FIGS. 1*e, f* contains a key character register (register Z) with five stages $Z_1$–$Z_5$. This register normally receives on terminals J, K of stage $Z_1$ its information in serial form from the key generator. However, information can also be supplied in parallel form from an external tape reader designated TR. Block 9 also contains the main shift pulse amplifier consisting of gates C2, C3, C4, and F, G, H1 and H2. It also contains a shift register (register Y) $Y_1$–$Y_5$ which is used as an intermediate storage register during the start procedure.

Blocks 10, 11 and 12 in FIGS, 1*e, f, g, h, i* constitute the key generator, which comprises two 15 bit non-linear feedback shift registers, REG $I_1$–REG $I_{15}$, REG $II_1$–REG $II_{15}$, with trigger flip-flops and associated output and input gating circuits.

Figure 5:
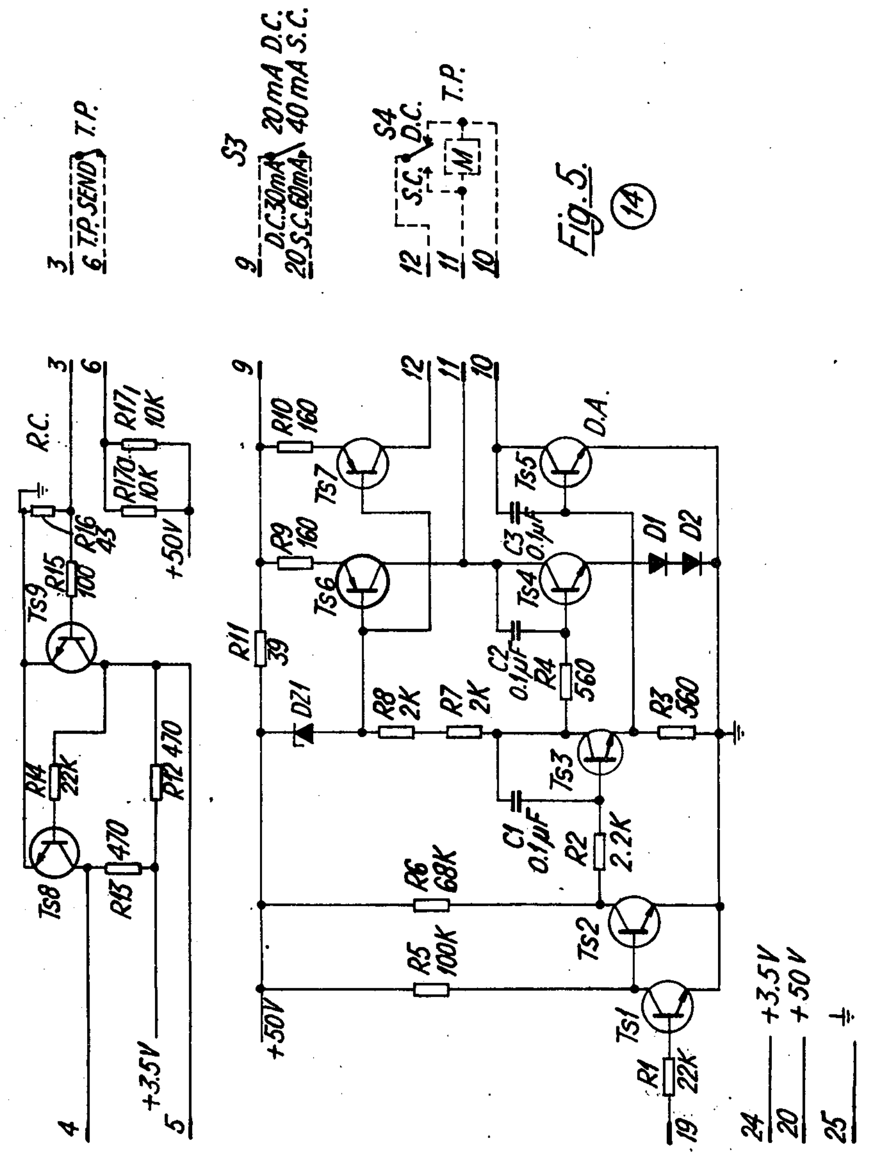
FIG. 5 shows a detailed schematic of the block 14 in FIG. 2*a*, a teleprinter drive amplifier (DA) and a reading circuit (RC)

Block 14 in FIG. 2*a* contains the blocks RC (Reading Circuit) and DA (Driving Amplifier) which is shown in detail in FIG. 5.

PLUG A in FIGS. 1*c, d* contains strapped interconnections between its terminals, which determine the feedback pattern on the feedback shift register $X_1$–$X_5$, block 2, used in the enciphering and deciphering process.

Figure 1F:
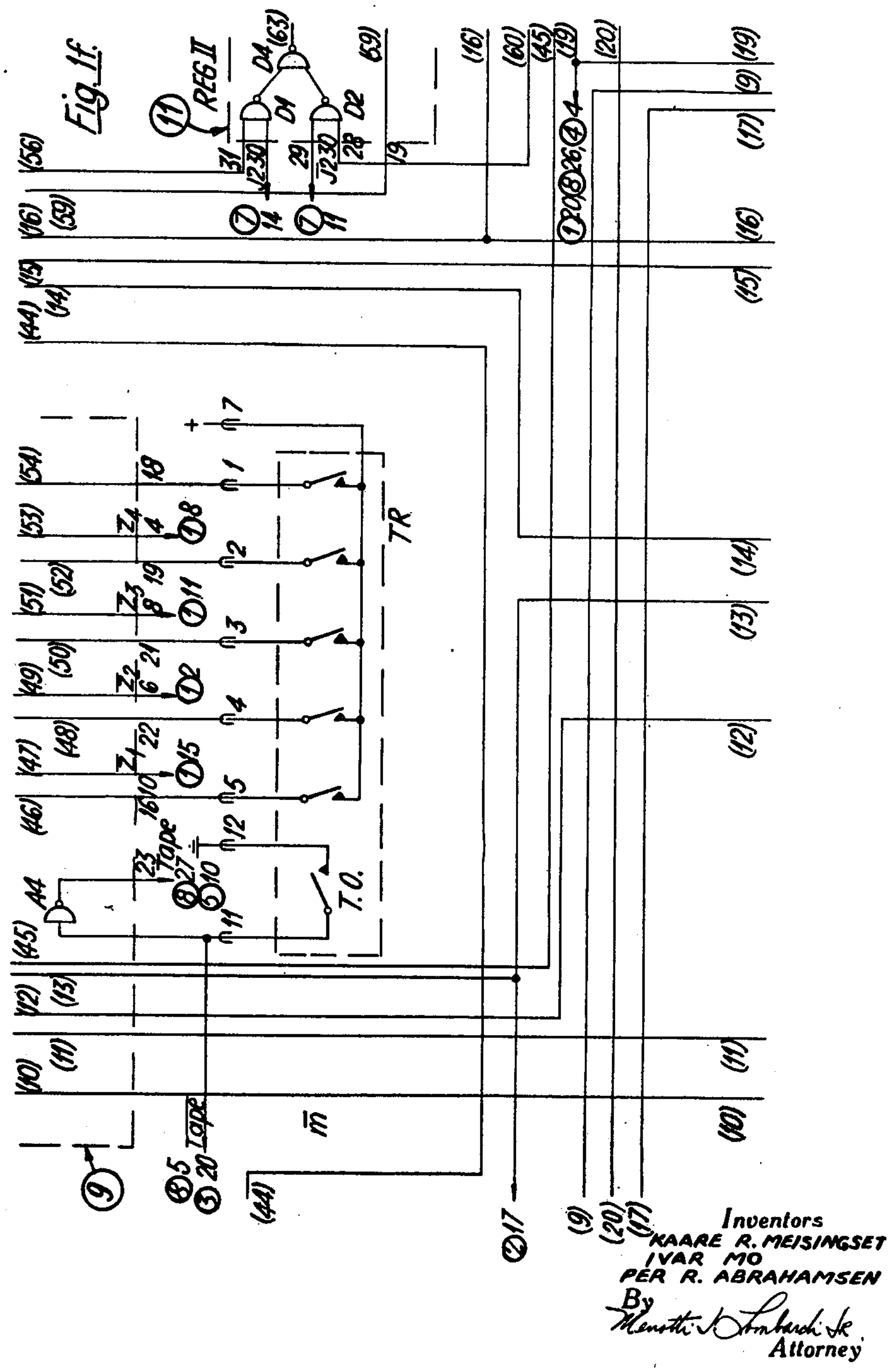

Block TR in FIG. 1*f* is a tape reader. This device is normally not connected, but can be attached to make possible the use of one time key tape as key material.

Figure 1G:
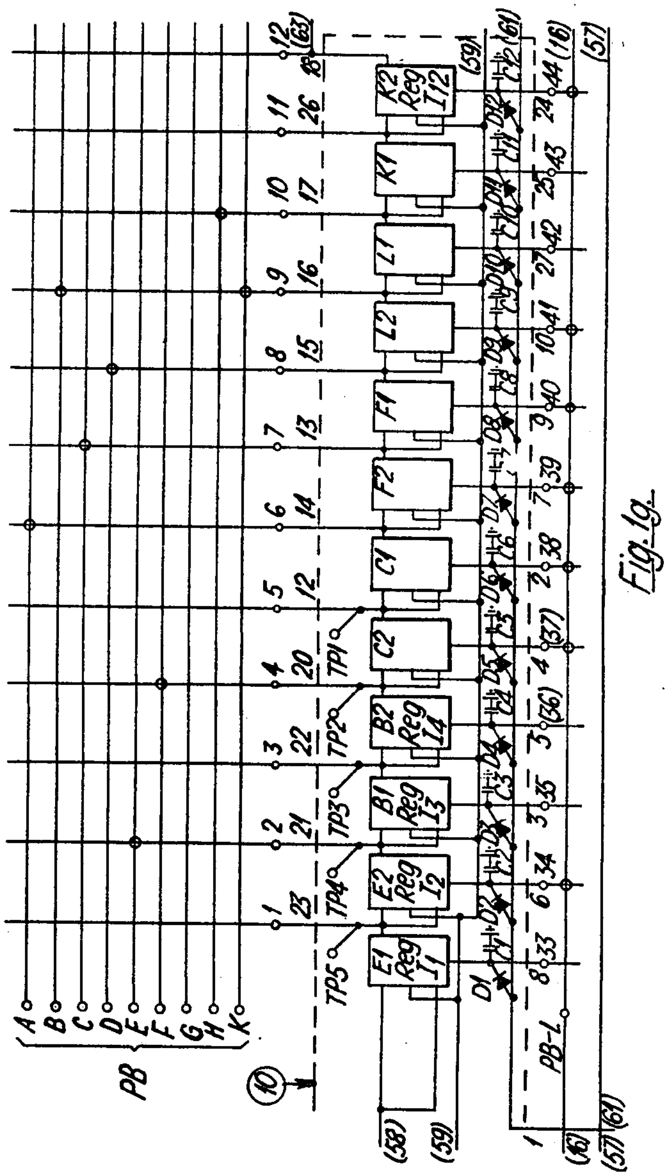
Figure 1H:
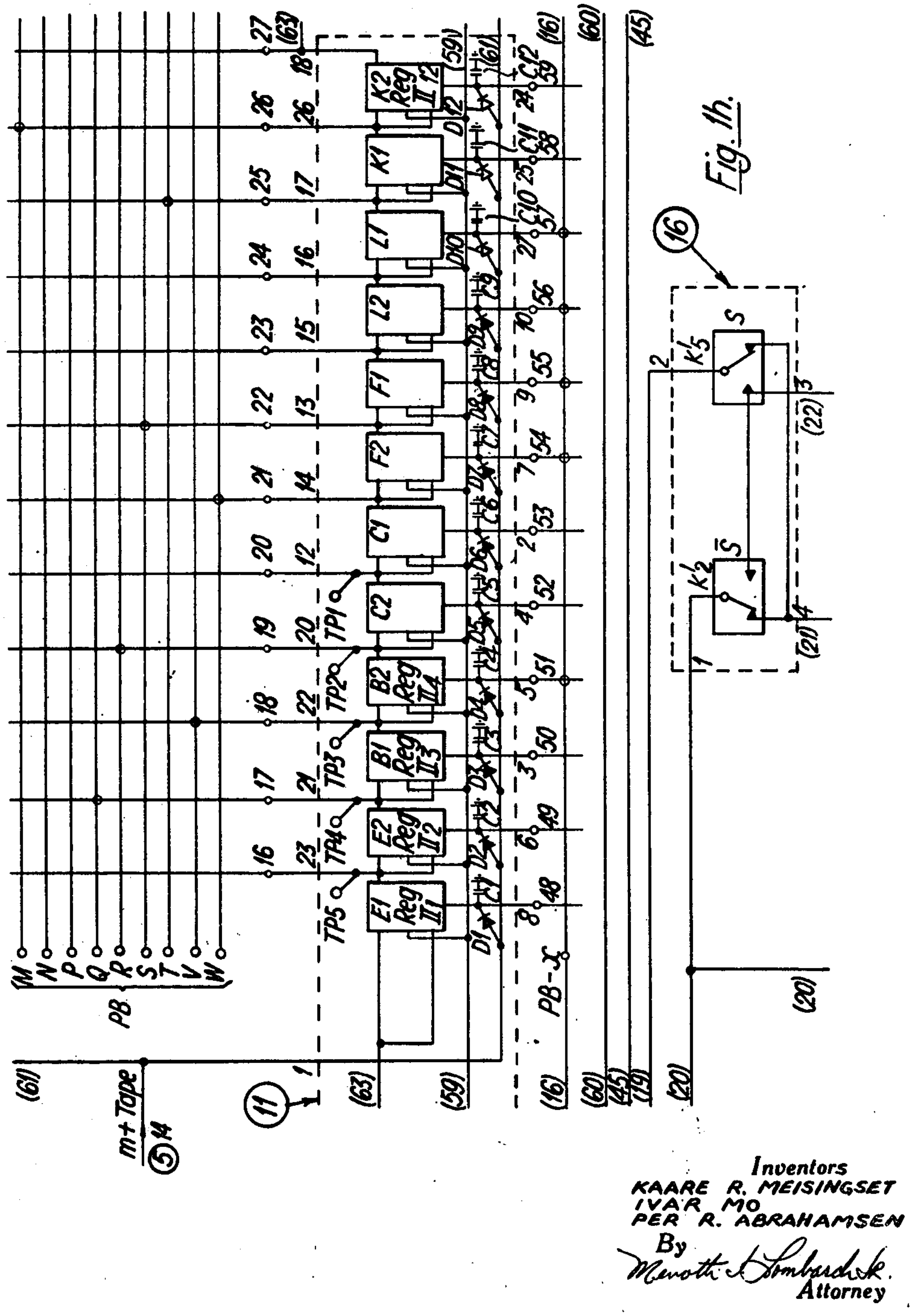

The grids designated PB in FIGS. 1*g, h, i* show the schematic of a pinboard used for inserting key material information into the equipment. Circles around intersections between horizontal and vertical lines indicate that there is electrical connection by means of a shorting pin.

In FIGS. 1*e, h,* 2*b* are shown several change-over contacts designated either S or $\overline{S}$. These are contacts on a three position lever switch. The middle position of this switch corresponds to rest or clear mode of the equipment. The other two positions correspond to send and receive, or enciphering and deciphering mode respectively.

Block TP in FIG. 1*f* indicates a teleprinter with its transmitting contact and receiving coil. This is also shown in FIG. 5.

Block TB1, FIG. 2*a* is a terminal strip. S4 in FIG. 2*a* is a toggle switch whose two positions correspond to single current and double current operation of the teleprinter. S3 in FIGS. 2*a* is a toggle switch whose two positions correspond to twenty and thirty ma. double current or forty and sixty ma. single current to the teleprinter receiving magnet. The multiposition switch JB in FIG. 2*a* is used for selecting the proper time constant of the one-shot circuit in block 6, FIG. 2*a*.

Functional description

Introduction.—As mentioned, the cipher text must not contain characters which cannot be punched by a normal teleprinter in a telex installation, or characters that will disturb the transmission on a telex channel, such as letter D in upper case.

The enciphering process starts when the reading circuit receives the start pulse of a clear text character X, on operation of the keyboard or automatic transmitter of a teleprinter. The reading circuit starts an oscillator, which in turn gives shift pulses to registers X, FIGS. 2*c, d,* I, FIGS. 1*g, i,* II, FIGS. 1*h, i* and Z, FIG. 1*e*.

Thus, the preceding enciphered character is sent to the teleprinter from register X via the teleprinter drive amplifier. When register X contains the 5 information bits, register Z contains 5 "new" key bits and counter P, FIGS. 2*g, h* is set to a fresh P-number. Now, register X is connected as a maximal length feedback shift register, and shift pulses are fed to counter P and register X. The supply of 25 kHz. shift pulses is stopped when counter $P=0$, i.e. after P pulses. Thereafter, register X is connected as a normal shift register and is set to the information register X⊕ register Z. This is the enciphered form of the clear text, which is sent out when the next clear text character is shifted into register X.

This is the normal enciphering process. In order to avoid certain complications in connection with telex channels, the cipher text characters ALL SPACE and FIGURE SHIFT are not used. The first one because some teleprinters cannot perforate ALL SPACE. FIGURE SHIFT is avoided because disturbances of the transmission can occur for certain characters in upper case.

Now, when one of these two combinations is detected as enciphering text, register X is not set to register X⊕ register Z, but remains undisturbed. Thus, the shifted version of the clear text in register X is sent out as cipher text.

It will be seen that this process is reversible, making deciphering possible.

Enciphering mode.—To begin with, it is assumed that a start procedure, which will be explained later, has been completed and that the normal enciphering is to take place. The character to be enciphered enters the equipment serially from the teleprinter transmitting contact TP, FIG. 2*a* which is energized from the reading circuit RC in block 14, FIG. 2*a*. In the reading circuit RC the current which flows, or not flows, to the transmitting contact is converted to suitable logical levels for the rest of the equipment. The output signal from the reading circuit is passed to block 4 (gate A1), FIG. 2*c* which contains the input counter $\overline{FFo}$, FF*e*, FF*a*, FF*b*, FF*c*, FF*d*, FIG. 2*c* and associated circuits. Upon reception of the start pulse of the character to be enciphered, this input counter will pass through a complete cycle at a rate determined by the one-shot circuit OS in the block 6, FIG. 2*a*. Signals derived from the input counter are used to govern the instepping of the character into the input register $X_1$–$X_5$ in block 2, FIGS. 1*c, d,* and also to step the key generator registers in blocks 10, 11 and 12. When the input counter has completed its cycle, the five information elements of the teleprinter character will be stored in the input register.

The enciphering process will then start. This process is governed by a ring counter $k_1$–$k_5$ in block 3, FIG. 2*f*, called the counter K. The counter K remains in its rest position K1 during the cycle of the input counter. At the end of the input counter cycle, i.e. when the last information element of teleprinter character has been stepped into register X, the counter K will step to position K2. In this position, K2, evaluation and possible modification of the plain text character in register X will take place. This is necessary because the cipher text which finally results from the enciphering process must not contain characters which cannot readily be transmitted on a telex channel. In this equipment the characters ALL SPACE and FIGURE SHIFT should not occur in the enciphered text. The former is not present in the plain text, but the latter is. To have a FIGURE SHIFT excluded from the enciphered text, this plain text character will be changed into CARRIAGE RETURN. To avoid confusion, CARRIAGE RETURN in the plain text must be converted into LINE FEED. This is possible because it is assumed that in plain text the two characters, CARRIAGE RETURN and LINE FEED, always occur in pairs. If necessary, the modifications of the plain text described above, are performed in program counter position K2, by applying a shift pulse to the input register stages $X_1$–$X_5$. The program counter K then steps to position K3.

Figure 2F:
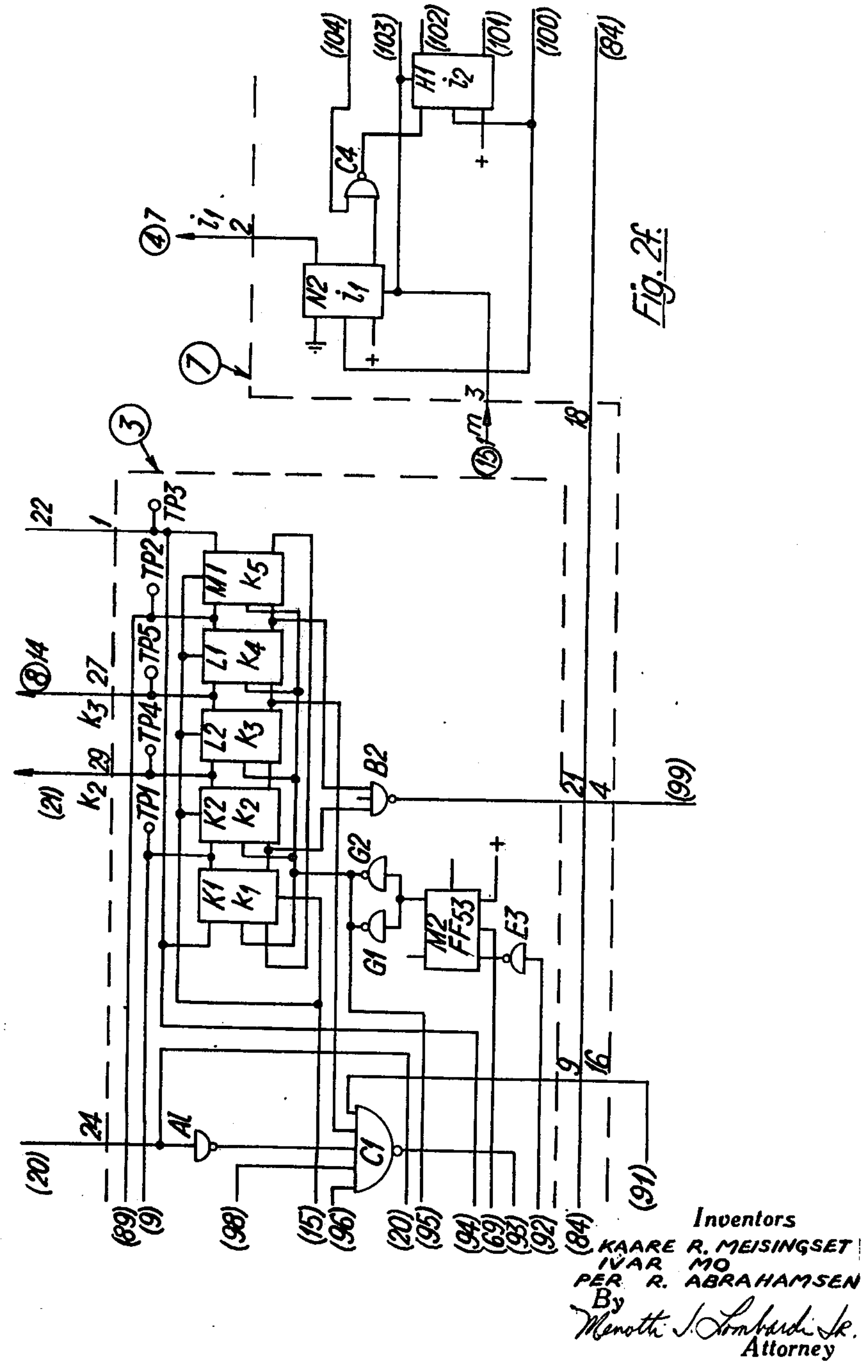

In this position, K3, the first step of the enciphering process takes place. The input register X is now connected as a maximum length feedback register. It will receive a number of shift pulses determined by the content of the counter P, FIG. 2*g, h,* which is constituted by flip-flop $C_1$–$C_5$ in block 7, FIG. 2*g, h*. This counter is stepped downwards from its initial position to zero by the main clock signal. The initial position is determined by a pseudo-random number P transferred from the key generator REG I, REG II, FIGS. 1*g, h, i*, to the counter P, FIGS. 2*g, h*, in parallel form, when the main program counter K, FIG. 2*f*, is in position K2. When the counter P has reached the zero state, the program counter K will step from K3 to K4, and the second step of the enciphering procedure will take place.

This second enciphering step comprises modulo-2 addition, in block 1, of the content of the input register X with a random number supplied in parallel form from the register Z in block 9, FIG. 1*e*. As will be seen from the schematic, the register Z comprises five stages, $Z_1$ to $Z_5$ connected as a normal straight shift register. The information passing into register Z is derived from the outputs of the two key generator registers, REG I, REG II, at gate D3 in block 12, FIG. 1*i*. Register Z is shifted together with the two generator registers REG I, REG II during the instepping of the plain text character in program counter position K1. The modulo-2 addition, mentioned above, of the contents of input register X and key character register Z is performed in parallel without any transfer of carry information from stage to stage. Before the program counter K is stepped to K5, the content of the register X is checked to control whether it can be transmitted to the line. Gates D1 and A2, block 2, FIG. 1*d*, check whether the register contains the characters ALL SPACE or FIGURE SHIFT, respectively, and the modulo-2 addition will then be repeated. The content of register X will then be as it was after step one of the enciphering process. Because ALL SPACE never will be contained in the normal cycle of a maximum length feedback register and because the position FIGURE SHIFT is automatically bypassed in this equipment, the content of register X after step one of the enciphering process can always be transmitted to the line. As one can see, the second step of the enciphering process is not used, when it results in a character which cannot be transmitted to the line.

The enciphered character now contained in the register X is transferred to the teleprinter receiving magnet TP FIG. 2*a*, during the instepping of the next plain text character into register X, whereupon the process described above is repeated.

The start procedure mentioned earlier is necessary to ensure different starting points of the key generator registers REG I, REG II from message to message. In the enciphering mode this start procedure comprises the instepping of 6 teleprinter characters, i.e. 30 bits, into the key generator registers. Simultaneously these 6 characters are enciphered and transferred to the teleprinter receiving magnet TP (and later on to the line). At the receiving or deciphering end, the 6 characters will be deciphered and transferred into the key generator registers of the deciphering equipment. In this way the same starting point is ensured at both the enciphering and deciphering equipment. The 6 characters defining a start point are during normal operation taken from a start point table prepared in advance for a particular feedback pattern for the key generator registers. During enciphering the start point characters are not transferred directly from the reading circuit to the key generator registers, but are passed through an intermediate storage register, register Y in block 9, FIG. 1*e*. Register Y receives shift pulses simultaneously with the key generator registers REG I, REG II, and the key character register Z mentioned above.

The necessary gating functions during the start procedure are taken care of by means of two three-stage ring counters I and J in block 7, FIGS. 2*f, h*. The counter I, comprising the stages $i_2$–$i_4$, is stepped once for each complete cycle of the counter K, FIG. 2*f*. The counter J, comprising the stages $j_1$–$j_3$, is stepped once for each complete cycle of the counter I.

The pinboard PB, FIGS. 1*g, h, i*, store information on how to set the registers REG I and REG II, FIGS. 1*e, f, g, h, i*, initially. There are $2^{30} \approx 10^9$ possible settings. The initial settings are used for ciphering of the 6 characters which are selected to give adequate cycle lengths in said registers. The counters $i_2$–$i_4$ and $j_1$–$j_3$, block 7, keep record of the start procedure and determine when to feed the registers with the start information.

The main clock signal governing all the functions in the equipment is derived from a 25 kHz. square wave oscillator in block 5, FIG. 2*a*. In block 5 is also contained a reset circuit which supplies the current needed to set all the flip-flops of the key generator registers to zero position when the equipment is in the plain or rest mode.

Deciphering mode.—The deciphering of a character starts with a transfer of a character from the teleprinter transmitting contact TP into the equipment, as in the enciphering mode. The start pulse of the character to be deciphered will also in this case initiate a cycle of the input counter in block 4, FIG. 2*c*. Simultaneously the information elements of the cipher text character to be deciphered are stepped into the input register X. This happens with the program counter K in its rest position K1. The two steps of the enciphering process will now have to be performed in reverse order. Therefore, in position K2 of the program counter K, the modulo-2 addition of the content of the register X and Z will be performed. If the content of register X after the modulo-2 addition is equal to ALL SPACE or FIGURE SHIFT, it is clear that the modulo-2 addition has been performed twice during enciphering. Therefore, it is also repeated here, and this means that only the opposite process of step 1 during enciphering will be performed. A five stage maximal length feedback register has a cycle length of 31. In this equipment, the position corresponding to FIGURE SHIFT is automatically bypassed. Therefore, the effective length of this register is 30 positions. To reproduce the initial plain text during the deciphering process, it is now necessary to step the register X, 30–P steps. This is done by appropriate setting of the counter P mentioned during the explanation of the enciphering process. The shifting of register X during deciphering is performed in the program counter position K3. Finally, in program counter position K4 a possible opposite modification of the one performed at the enciphering end must be done. As explained above, the character FIGURE SHIFT was modified into CARRIAGE RETURN and the character CARRIAGE RETURN was modified into LINE FEED. Therefore, if the deciphered character contained in register X is equal to CARRIAGE RETURN it must be converted into LINE FEED. This is done by applying one shift pulse to the stages of register X in program counter position K4. If the content of register X after feedback is equal to LINE FEED, this may be due to either a LINE FEED character during enciphering or due to a converted CARRIAGE RETURN during enciphering. As mentioned above, it is assumed that the characters CARRIAGE RETURN and LINE FEED occur as pairs in the same order as just mentioned. When the character LINE FEED first results from the feedback shift register operation, it is unconditionally modified to CARRIAGE RETURN in the position K4 of the program counter. This modification is also stored by setting the MEMO flip-flop in block 3, FIG. 2*d*. Provided CARRIAGE RETURN and LINE FEED are always transmitted in pairs, the next character resulting from the feedback shift register operation during deciphering will again be LINE FEED. Since the MEMO flip-flop now is set, the modification of the character LINE FEED will now be omitted in program counter position K4. This means that the deciphered character to be transferred to the teleprinter receiving magnet TP, FIG. 2*a*, during the next instepping process, will be LINE FEED. As one will understand, the character CARRIAGE RETURN has in this way been made redundant, and the teleprinter combination normally used for transmitting this character is instead used for transmitting FIGURE SHIFT. The omission of the teleprinter combination FIGURE SHIFT from the enciphered text, is introduced in order to avoid a figure case in the cipher text alphabet. This is necessary because it can not be allowed, when transmitting into an unattended telex terminal, to have the answer-back unit released when the cipher text is coming in. As will be known, the answer-back unit is released by means of the letter D in upper case. By omitting the character FIGURE SHIFT entirely in the cipher text, the teleprinter will never be set to upper case when receiving an enciphered message.

Description of the main functional circuits

Key generator.—The key generator comprises two nonlinear feedback shift registers, REG I and REG II (blocks 10, 11, 12, FIGS. 1*g, h, i*), each with 15 stages, REG $I_{1-15}$ and REG $II_{1-15}$ respectively and with a feedback signal $F(A_i, A_j, A_k, A_l) \oplus A_{15}$, where $F(A_i, A_j, A_k, A_l)$ is a nonlinear function, whose table of combinations of the binary variables $A_i$, $A_j$, $A_k$ and $A_l$ are the output signals from four of the register stages. *i, j, k* and *l* are all different, and are otherwise randomly selected by means of pins on a pinboard PB.

This is shown in FIGS. 1*g, h, i*, where the feedback signal from REG I is taken from stages Nos. 4, 14, 10 and 9, so that *i, j, k* and *l* in this case are equal to 4, 14, 10 and 9 respectively. These four output signals are fed to the gates B4, C1, B3 and C2 in block 12, FIG. 1*i*, and the combined signal from the gate C2 is added modulo-2 in the gates E4, F1 to the output signal $A_{15}$ from the last stage REG $I_{15}$. The feedback signal is applied to the register REG I at the gate D1, block 10, FIGS. 1*e, g*.

Figure 1I:
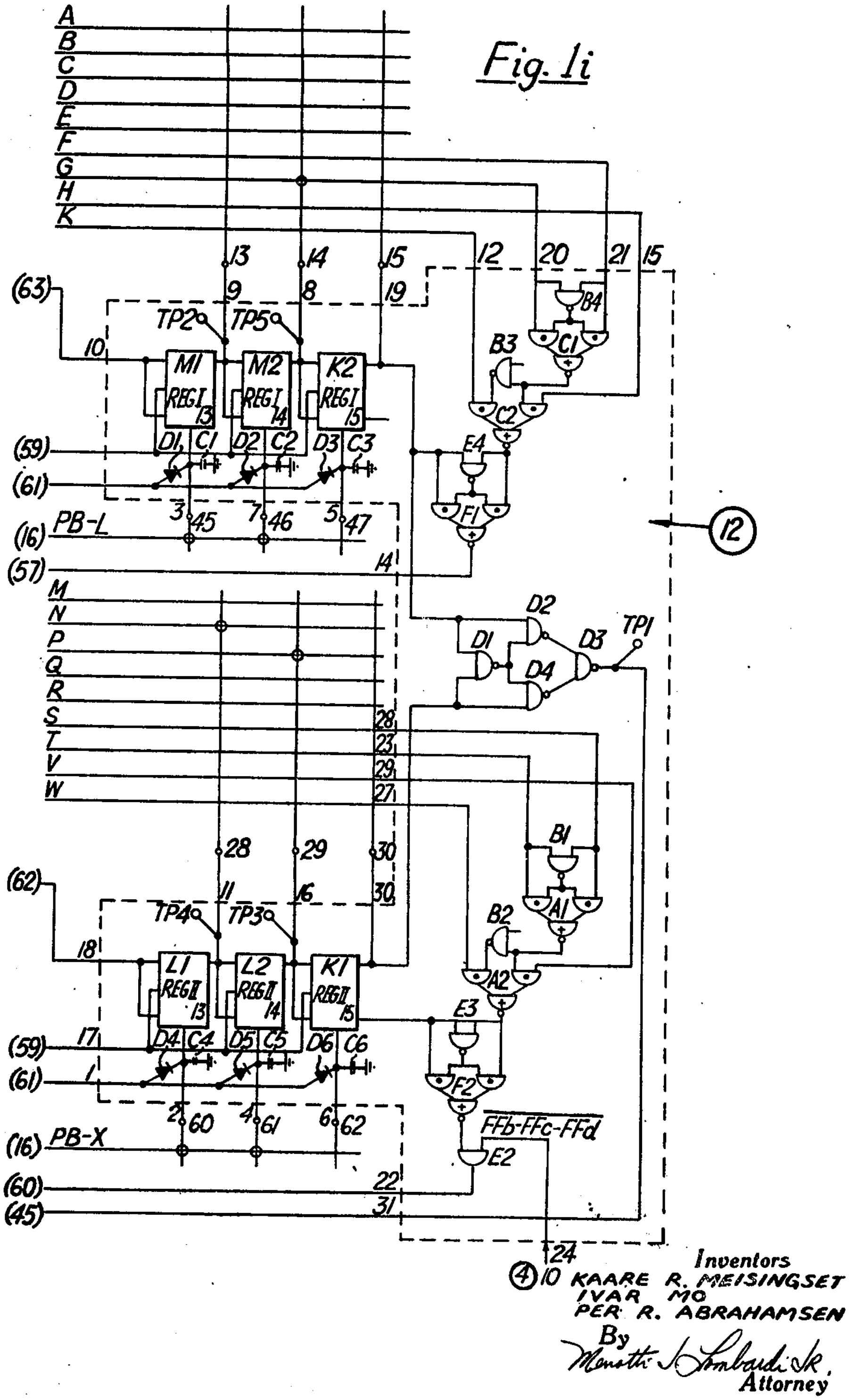

The feedback signal for the register REG II is similarly taken from the stages Nos. 7, 10, 3 and 6, combined in the gates B1, A1, B2 and A2, block 12, FIG. 1*i*. This combined signal is added modulo-2 to the output signal $A_{15}$ from the last register stage REG $II_{15}$ in the gates E3, F2 and applied to the register input at the gate D2, block 11, FIGS. 1*f, h*.

This is a type of register which is not yet fully explained mathematically in the literature, but it is evident that a long cycle from such a register will always present a pseudo-random patter. Moreover, the sequences usually have different lengths, which means, that the physical lengths of the key generator registers may be equal. However, there are certain chances that a sequence can be very short. Thus, in this system, the start points are not completely random, but are selected to give adequate cycle lengths. In the present equipment, which has two 15 bit registers, 6 characters must be selected for each message to be sent. The output signals from the two registers are added modulo-2 in the gates D1, D2, D3 and D4, FIG. 1*i*, to give the desired sequence of pseudo-random key bits. Such sequences are stored in a 5-bit register $Z_1$–$Z_5$, block 9, FIG. 1*e*. The number of different connections is $$\binom{15}{4}\times\left(\binom{15}{4}-1\right)\approx 1.86\times 10^6$$

In the two registers REG I and REG II there are used trigger flip-flops. In a trigger flip-flop the content after a clock pulse is dependent upon the input signal as well as upon the signal present in the flip-flop itself. Thus, the following set of equations describes the performance of a register:

$$A_1'=F(A_i, A_j, A_k, A_l)\oplus A_{15}\oplus A_1$$

$$A_2'=A_1\oplus A_2$$

$$A_3'=A_2\oplus A_3$$

* * * * *

$$A_{15}'=A_{14}\oplus A_{15}$$

$A_1$ is the signal present in register stage No. 1 before a clock pulse and $A_1'$ is the signal present in the same stage after the clock pulse. Similarly for the other stages, and the performance is identical for the two registers.

Generator for "P."—P is a 5-bit pseudo-random number, taken from the two registers REG I and REG II, blocks 10, 11, 12, FIGS. 1*g, h, i*, in the manner shown in block 8, FIGS. 2*e, g, h*. Each bit is the result of a modulo-2 addition of output signals from randomly selected bits in both registers. Block 8, FIGS. 2*e, g, h*, comprises 5 gate complexes to each of which there are applied two signals from the pin board PB. To the first gate complex comprising the gates C1, C2, C3, C4, B1, B2, B3 and D2, block 8, FIG. 2*e*, are applied signals from the pin board multiples PB/A and PB/M. As will be seen from FIGS. 1*g, h*, PB/A is associated with REG I, while PB/M is associated with REG II. A similar connection is assigned to the other four gate complexes. The number of different usable connections is $$\binom{15}{5}\times\binom{15}{5}\approx 9\times 10^6$$

Figure 2G:
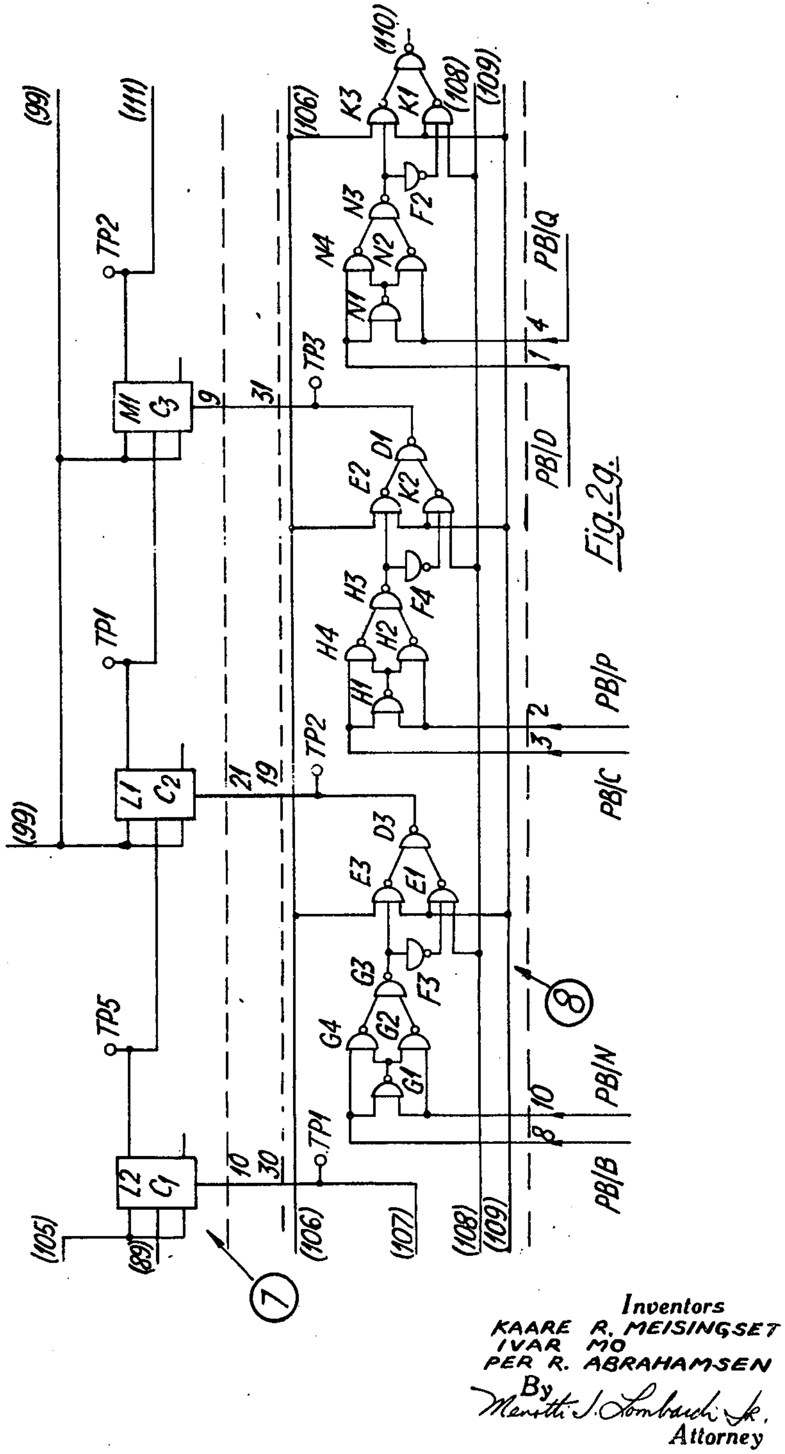
Figure 2H:
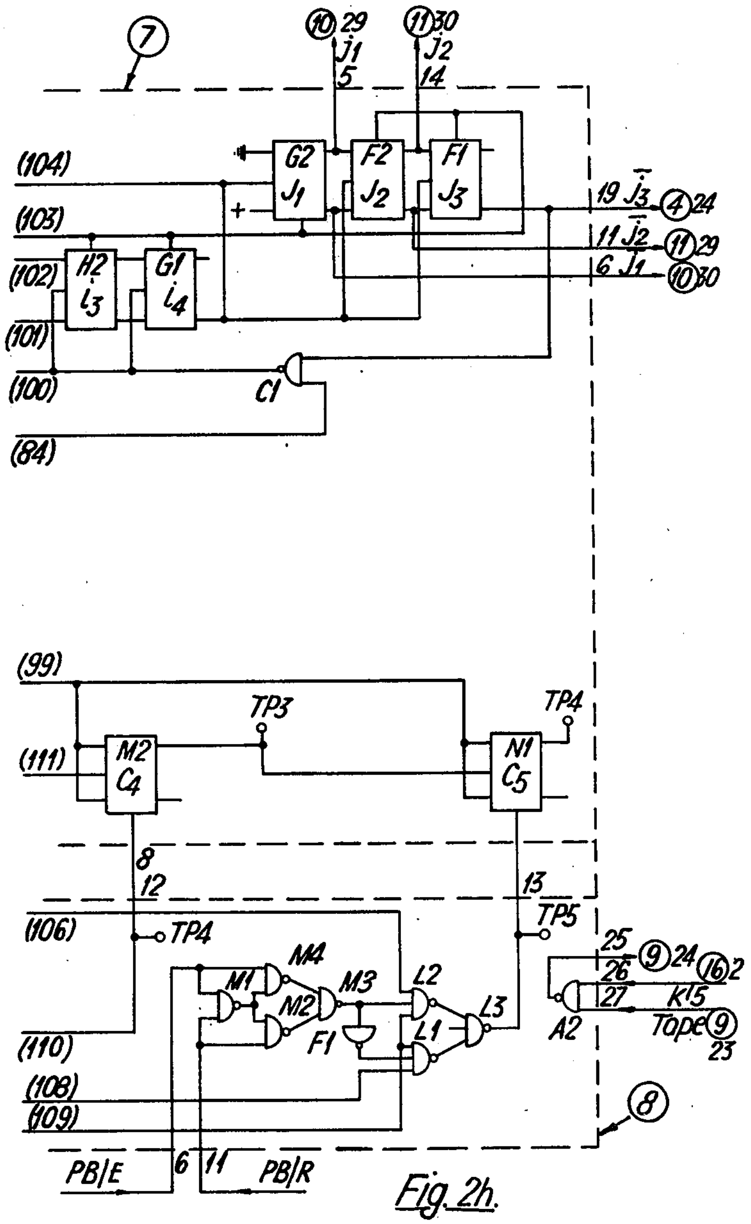

The output from each of the gate complexes which together constiute the number P is applied to a counter $C_1$–$C_5$, block 7, FIGS. 2*g, h*.

During enciphering, number P is fed to the binary counter $C_1$–$C_5$, but during the deciphering, this counter receives the number 31–P. In both cases the counter counts down to zero, while counting pulses from the 25 kHz. source.

Input register.—REG X (block 2, FIGS. 1*c, d*), consisting of stages $X_1$–$X_5$ has two modes of operation.

(a) It works as a normal 5-bit shift register, receiving shift pulses at 50 Hz. (for 50 bauds teleprinter speed).

(b) It works as a feedback shift register with each stage comprising a modulo-2 adder, e.g. the gate H1, and a flip-flop, e.g. $X_1$. Any output can be connected to any input by means of soldered connections on a plug, PLUG A, and these connections are made according to some polynominal, resulting in a maximal length sequence $2^5-1=31$. The 5-bit combination representing the character FIGURE SHIFT is removed from the cycle. Thus, REG X goes through a 30-cycle, which contains all possible 5-bit combinations except ALL SPACE and FIGURE SHIFT. There are approximately 15,000 different cycles, to choose between. The shift pulses in this case come from the 25 kHz. source, and the number of pulses is equal to the number of steps the counter $C_1$–$C_5$, block 7, is counting.

Pin board.—The pin board (PB), FIGS. 1*g, h, i*, is a board with "horizontal" and "vertical" terminal strips arranged in a matrix with approximately 300 cross-points (holes). A conducting pin inserted in a cross-point will connect the horizontal and vertical terminal strips at this particular cross-point. Pins on the pinboard determine which outputs to use for the feedback functions, which outputs to use generating the number P and which flip-flops to set initially.

One-shot multivibrator.—FIG. 3 shows the detailed schematic diagram of block 6 in FIG. 2*a*. This circuit, OS, gives the time reference for the teleprinter input and output signals. Defined time intervals are obtained by means of a monostable multivibrator comprising transistors T*s*1 and T*s*2 and associated components. In the rest mode, transistor T*s*1 is conducting, while T*s*2 is cut off. A trigger pulse applied through a diode D3, will cut off transistor T*s*1. Through the regenerative action of the circuit transistor T*s*2 will now become conducting. This state will last until capacitor C1 has been discharged through resistor R3. The transistor T*s*1 will start conducting again and T*s*2 will be cut off. Transistor T*s*4 becomes conducting for a short while, when the circuit flips back again to the rest mode. In this way the timing capacitor C1 will be quickly charged. Thereby, a very short recovery time is obtained. The pulse length of the circuit will be unaffected by a high duty ratio. The transistors T*s*3–4 and T*s*5–6 constitute the input network. Triggering of the circuit occurs every time transistor T*s*3 is switched on. The resistor R8 connected to the base T*s*3 is used to inhibit possible triggering pulses, when the circuit is in its quasi-stable position. The output signal is taken from the corrector of transistor Ts7. In the rest mode, transistor Ts2 is as stated above, non-conducting. Then Ts7 will also be non-conducting and the output level will be high. When the circuit is triggered to its quasi-stable state, Ts2 becomes conducting, and so will also Ts7. The output signal will then be low, i.e. nearly ground potential. The timing capacitor C1 comprises four elements designated C1*a*–C1*d*. The purpose of this arrangement is by means of external strapping to obtain different pulse length to adapt the circuit to various teleprinter speeds. Interconnection of terminals 3–4 gives a speed of 75 bauds, 6–4 corresponds to 50 bauds, and 5–4 corresponds to 45 bauds.

The transistors may be of the following types: Ts1: 2S 301; Ts2–3: 2S 302; Ts4: 2N 1711; Ts5–7: BSY 95A or equivalent components and all diodes may be of the type 1S 920 or equivalent.

Figure 4:
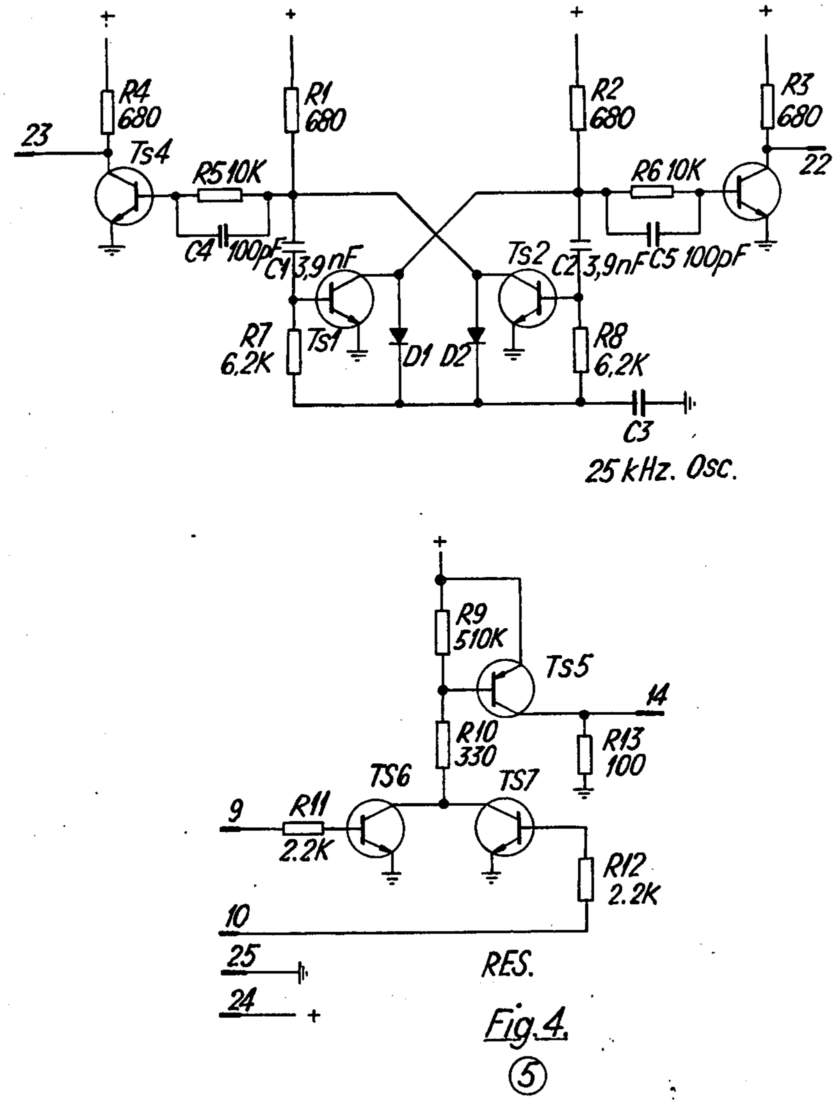
FIG. 4 shows a detailed schematic of the block 5 in FIG. 2*a*, a reset circuit (RES) and clock pulse generator (25 kHz. OSC)

Clock pulse generator.—FIG. 4 shows a detailed schematic of two different circuits in blocks 5, FIG. 2*a*. The upper one is the clock pulse generator, 25 kHz. OSC. This is an astable multivibrator comprising transistors Ts1 and Ts2 and associated components. The transistors Ts3 and Ts4 are the output amplifiers of the circuit. The purpose of the diodes D1, D2 and the smoothing capacitor C3 is to avoid a stable state with both transistors conducting simultaneously, which can occur with a conventional astable multivibrator.

Reset circuit.—On the lower part of FIG. 4 is shown a reset circuit RES whose function is to supply a DC signal to the key generator feedback registers. When one of the input transistors Ts6 or Ts7 is conducting, the output transistor Ts5 will also conduct and supply current to the load. If both input transistors are in the cut off state, the output transistor Ts5 will also be non-conducting. The transistors may be of the following types: Ts5: 2S 302; Ts1–4, 6–7: BSY 27 or equivalent components, and the diodes D–2 may be of the type 1S 920 or equivalent.

Reading circuit.—FIG. 5 shows the detailed schematic diagram of the circuits contained in block 14 in FIG. 2*a*. On the upper part of FIG. 5 is shown the reading circuit Rc. A current of approximately 40 ma. is fed from the +50 v. supply through the resistors R17 via terminals 6 and 3 through the teleprinter contact TP and back to the reading circuit RC. If the teleprinter contact is closed, the input transistor Ts9 will be conducting. If the teleprinter contact is open, Ts9 will be non-conducting. The output signal taken from the collector of Ts9 will be low when the teleprinter contact is closed, which corresponds to MARK, and high when the teleprinter contact is open, which corresponds to SPACE. To have the opposite phase of output signal available, an inverting stage comprising Ts8 and associated components is added to the reading circuit.

Driving amplifier.—On the lower part of FIG. 5 is shown the detailed schematic of the teleprinter driving amplifier DA. This circuit comprises input transistors Ts1, Ts2 and Ts3 with associated components, two constant current generators, Ts6 and Ts7 with associated components and two teleprinter current switching transistors Ts4, Ts5 with associated components. By means of external connections, S3, the circuit can be adapted to single or double current operation and to different current levels. In single current operation the two constant current generators are connected in parallel. In MARK condition transistor Ts5 will then be conducting and Ts4 non-conducting. The current from the constant current generators will then flow through the teleprinter receiving magnet M. In SPACE condition, the transistor Ts4 will be conducting and Ts5 non-conducting. No current will then flow through the teleprinter receiving magnet M. On the input side, MARK corresponds to high input signal and SPACE to low input signal. The transistors may be of the following types: Ts1, Ts2, Ts3, Ts8, Ts9: BSY 95A; Ts4, Ts5: 2N 1893; Ts6, Ts7: 2N 2904A or equivalent components, while the diodes D1, D2 may be of the type ZF 5.6 or equivalent.

Figure 6:
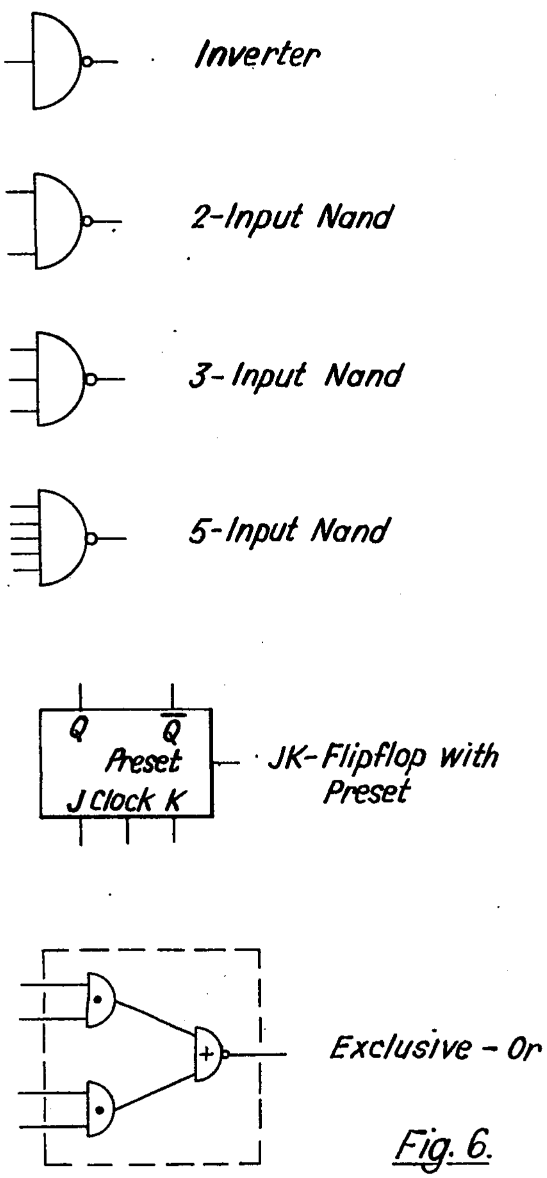
FIG. 6 shows the different logical symbols which are used in FIG. 1*c–i* and 2*a–h*.
Figures 1C, 7:
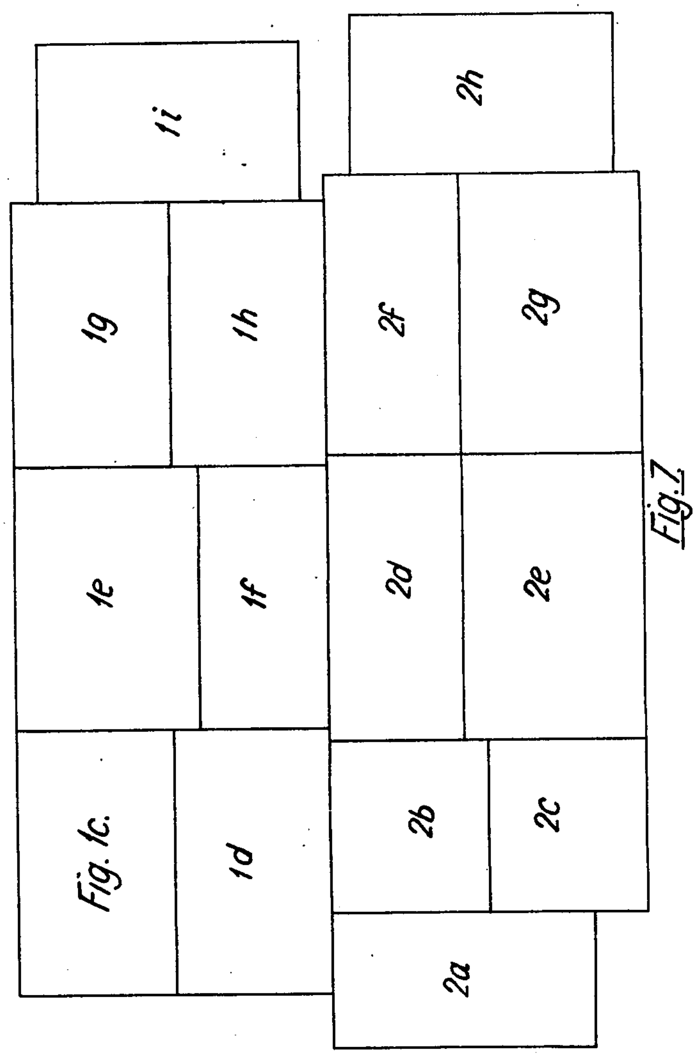
FIG. 7 shows how FIGS. 1*c–i* and 2*a–h* should be arranged in order to constitute a complete circuit diagram.

Logical symbols.—On FIG. 6 is shown the different symbols representing the various logic functions in the main diagram. These are: Inverter, 2-input NAND-gate, 3-input NAND-gate, 5-input NAND-gate, JK-flip-flop with preset and an EXCLUSIVE-OR-gate.

These logic symbols and their function are described in detail in the leaflet "Series 73 Solid Circuit Semi-conductor Networks," bulletin No. DL–S 567650, July 1965, which is published by Texas Instruments Incorporated. The symbols shown from the top in FIG. 6, correspond to the following TI networks: ¼ SN 7350, ¼ SN 7360, ⅓ SN 7331, ½ SN 7311, ½ SN 7302 and ½ SN 7370. The symbols corresponding to ¼ SN 7350, ½ SN 7302 and ½ SN 7370 are for simplification drawn somewhat differently.

We claim:

1. A method by means of which a clear text from a teleprinter may be enciphered into a text for transmission and reception by any teleprinter via telex channels, comprising:

converting the character FIGURE SHIFT in said clear text into the character LINE FEED or CARRIAGE RETURN, and converting both the characters LINE FEED and CARRIAGE RETURN into the character CARRIAGE RETURN or LINE FEED;

processing the converted clear text with an enciphering key material to produce an enciphered text not including the characters ALL SPACE and FIGURE SHIFT;

transmitting and receiving said enciphered text;

deciphering the enciphered text a corresponding key material;

converting the character LINE FEED or CARRIAGE RETURN into the character FIGURE SHIFT; and alternately converting a series of CARRIAGE RETURN or LINE FEED characters into the characters CARRIAGE RETURN and LINE FEED or LINE FEED and CARRIAGE RETURN, while single CARRIAGE RETURN or LINE FEED characters remain unconverted.

2. The method according to claim 1 wherein the step of converting the clear text into the converted clear text is governed by a register having 30 possible positions, corresponding to all teleprinter combinations except the characters ALL SPACE and FIGURE SHIFT, and wherein the step of processing the converter clear text with the key material is governed by said register, so that the output from said register is the enciphered text not including the characters ALL SPACE and FIGURE SHIFT.

3. The method according to claim 2 wherein the step of deciphering with the corresponding key material is in another register having 30 possible positions, corresponding to all teleprinter combinations except the characters ALL SPACE and FIGURE SHIFT, and the deciphered text is then converted in said other register to produce a modified clear text relative to said clear text.

No references cited.

RODNEY D. BENNETT, Jr., Primary Examiner

D. C. KAUFMAN, Assistant Examiner